Figure 1:
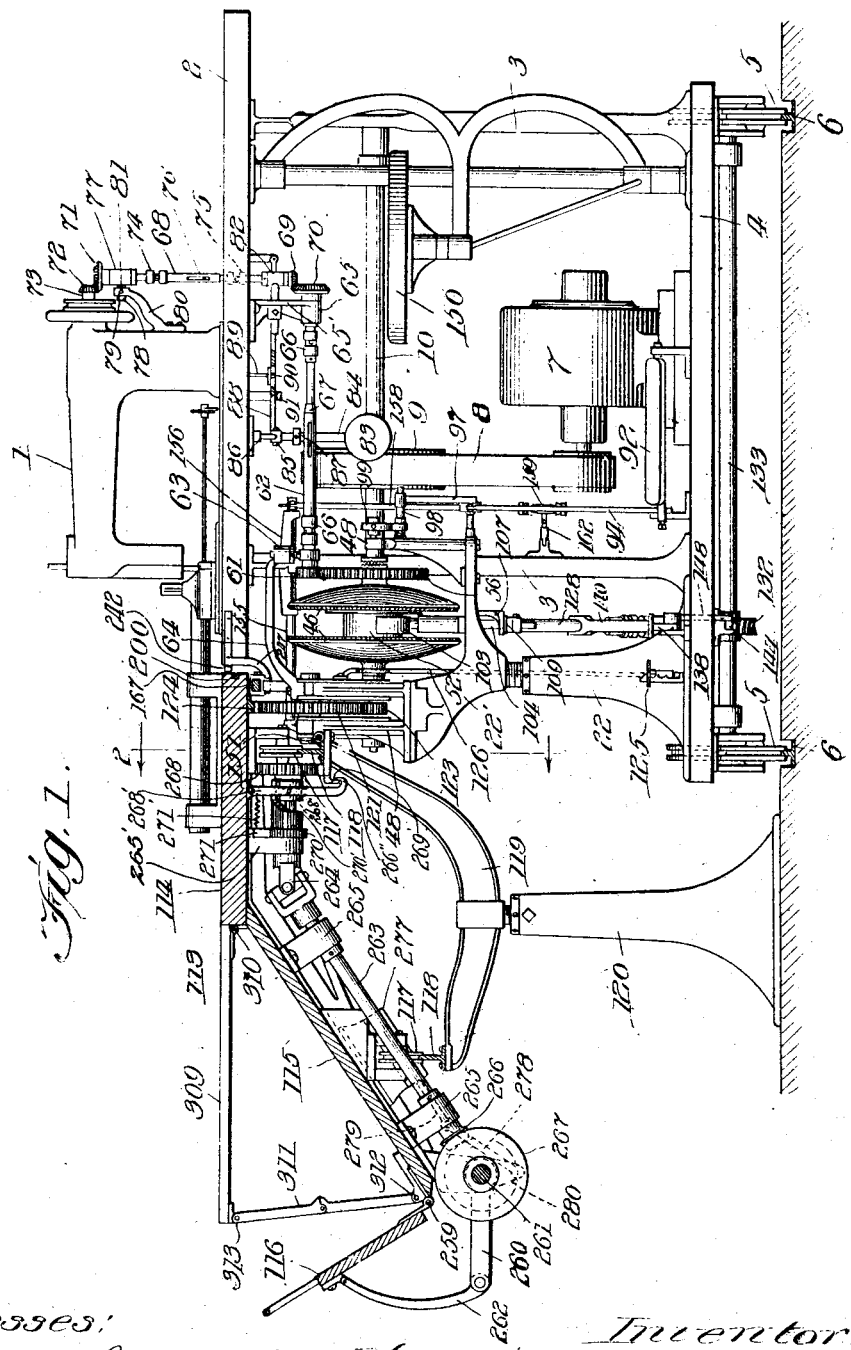

F. H. HODGKINS.
TEXTILE SEWING MACHINE.
APPLICATION FILED JUNE 1, 1909.

1,052,481.

Patented Feb. 11, 1913.
11 SHEETS—SHEET 1.

Witnesses:
Harry S. Gaither
M. A. Kiddie

Inventor:
Frederick H. Hodgkins
by Linthicum, Belt & Fuller
his Attorney

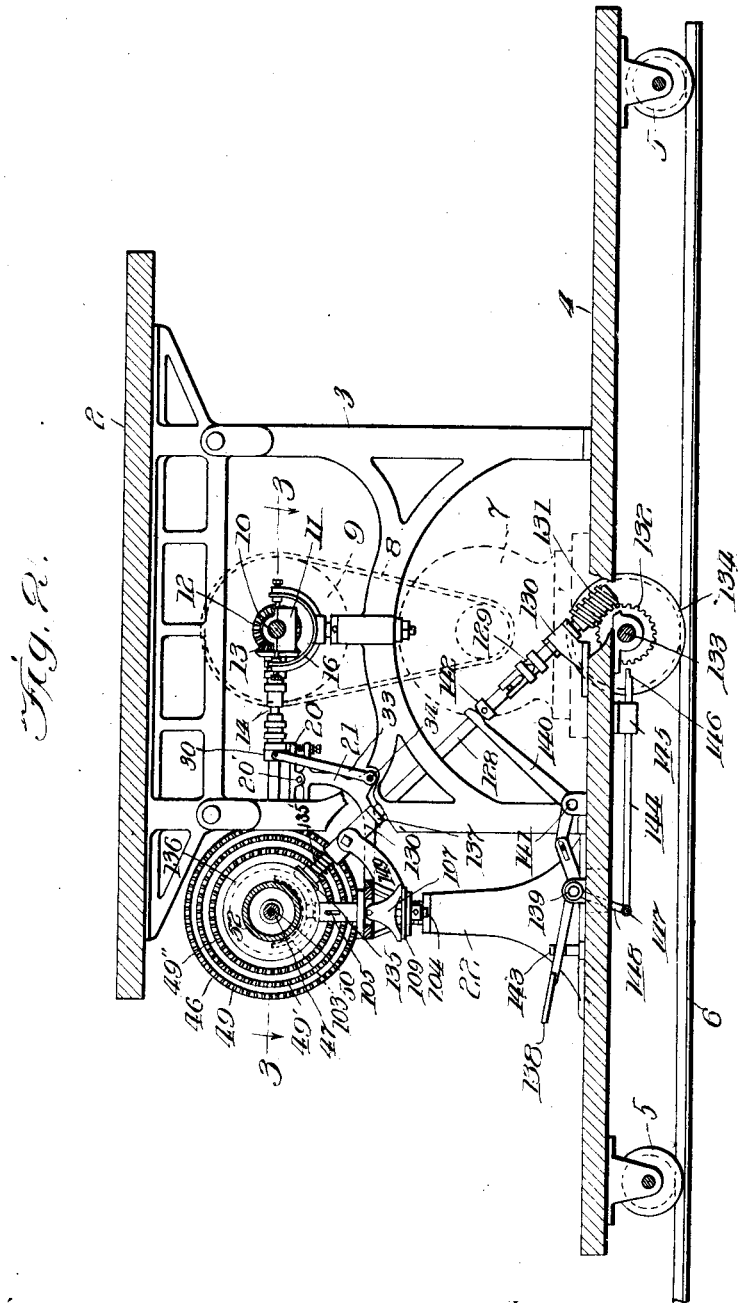

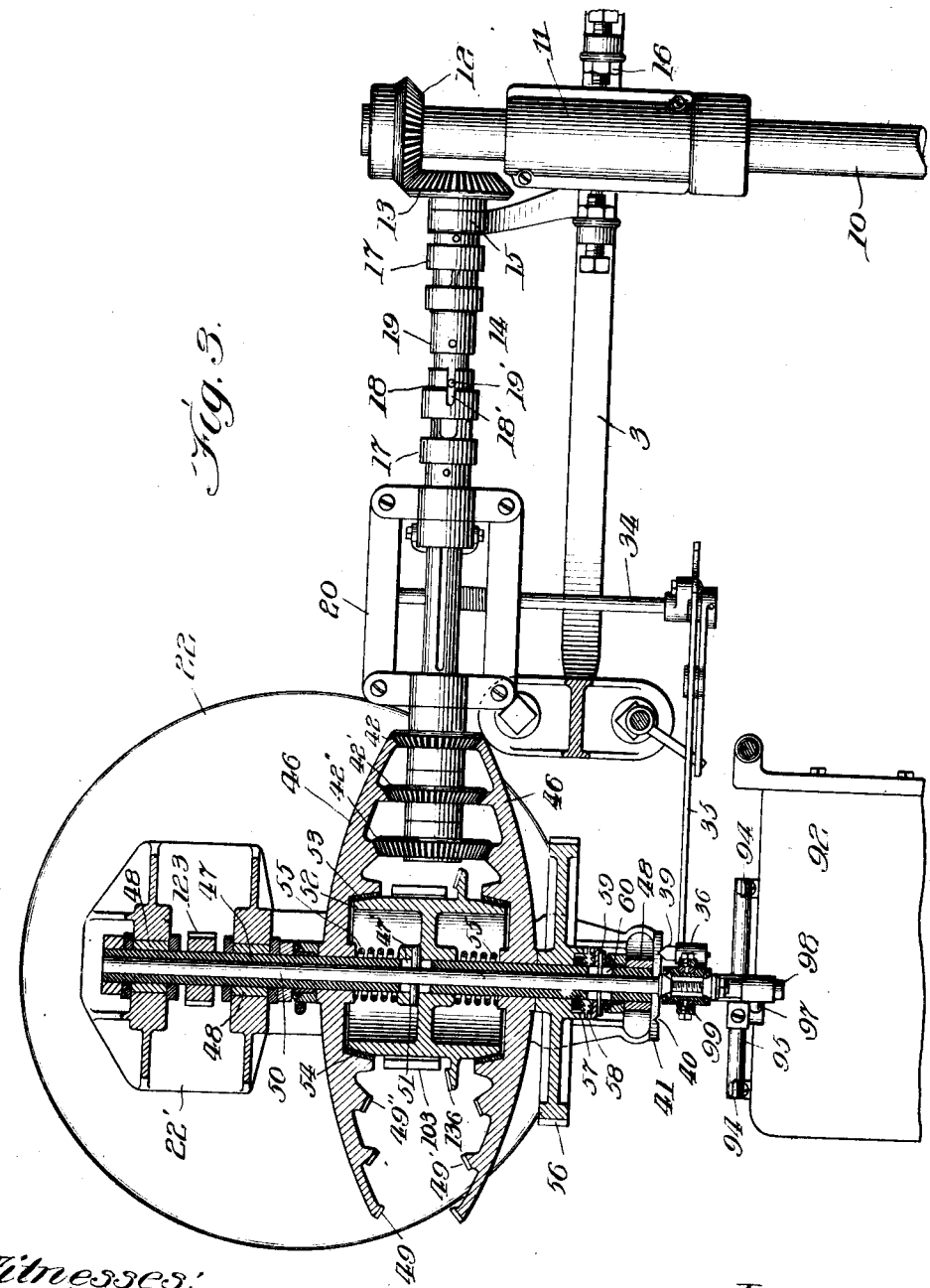

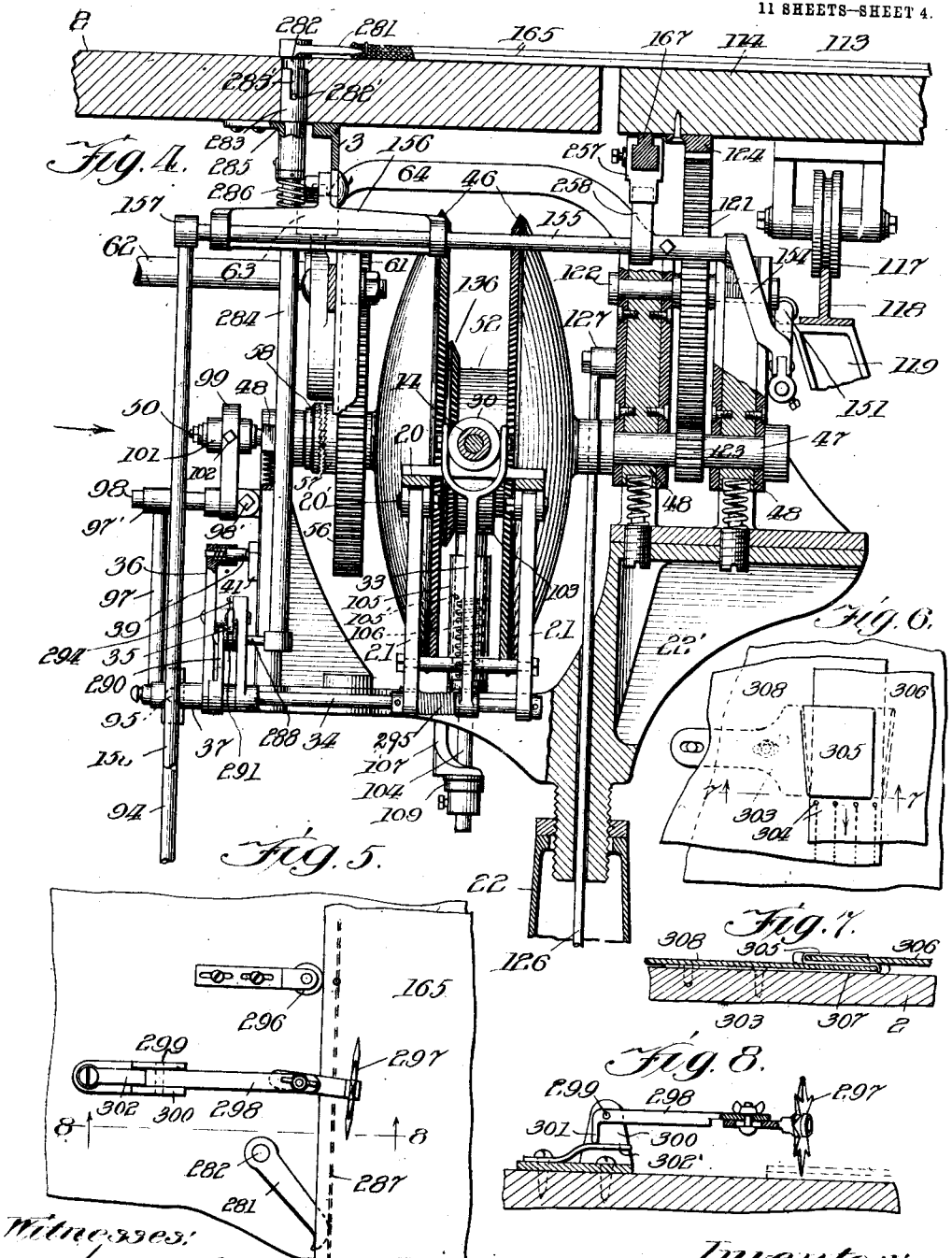

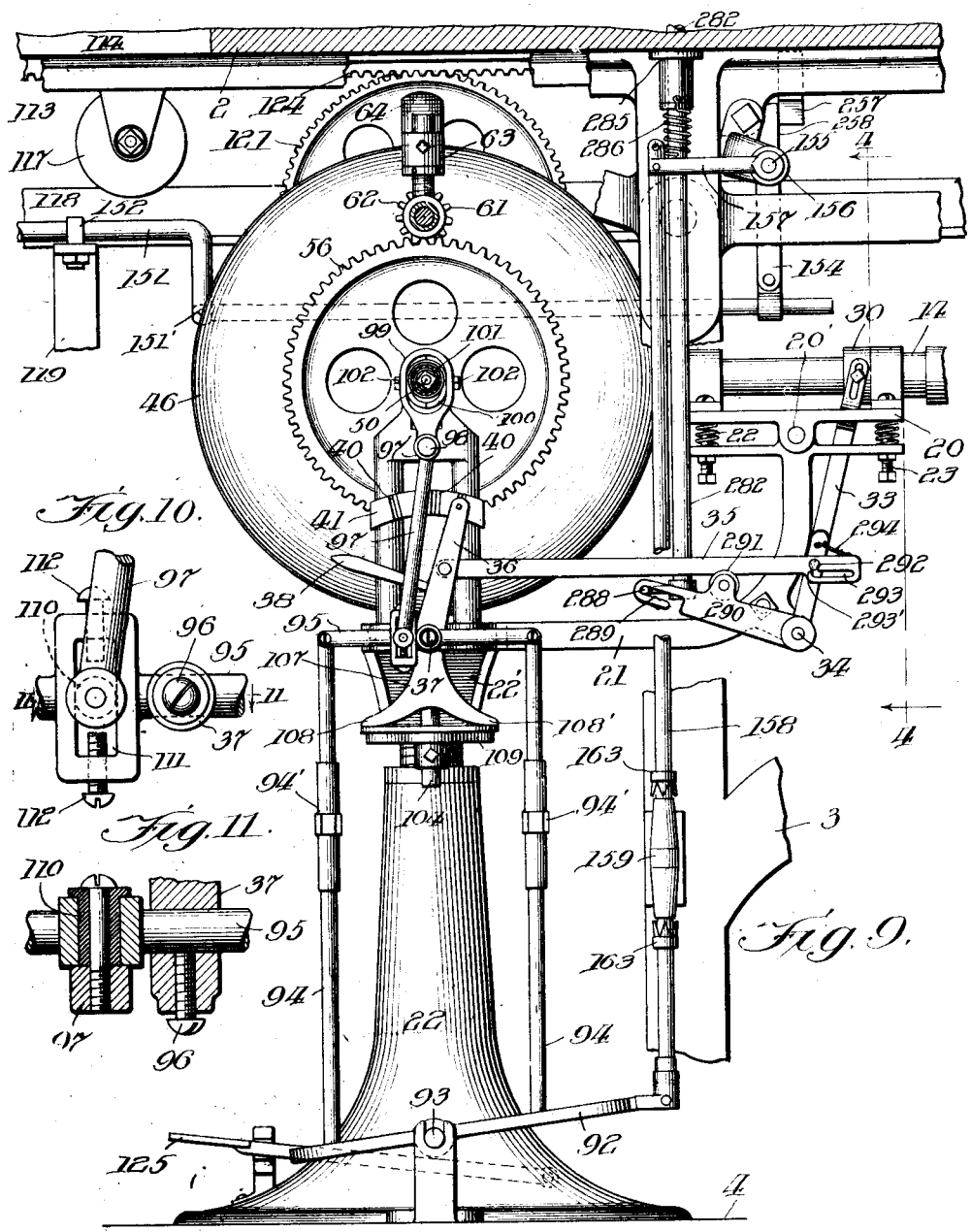

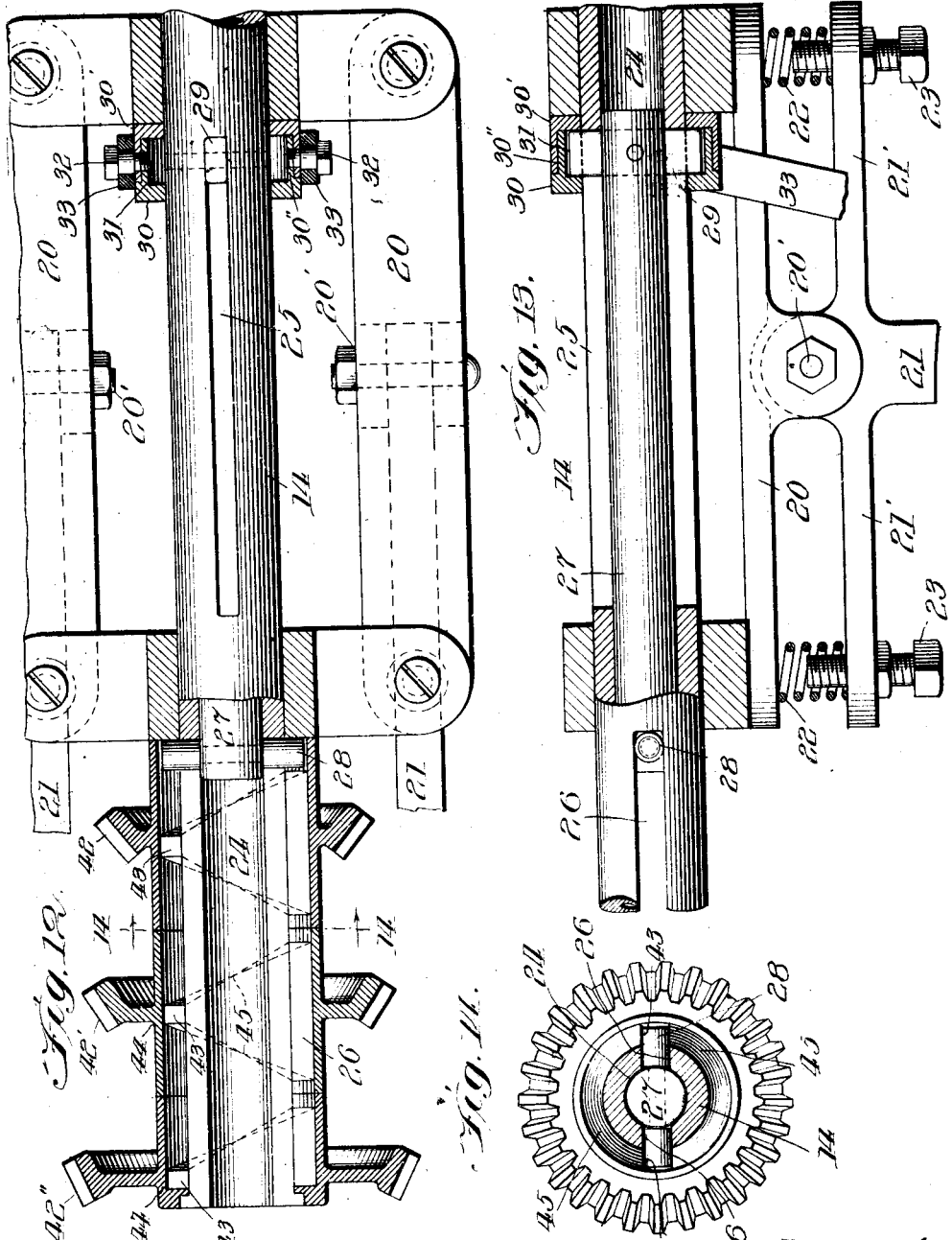

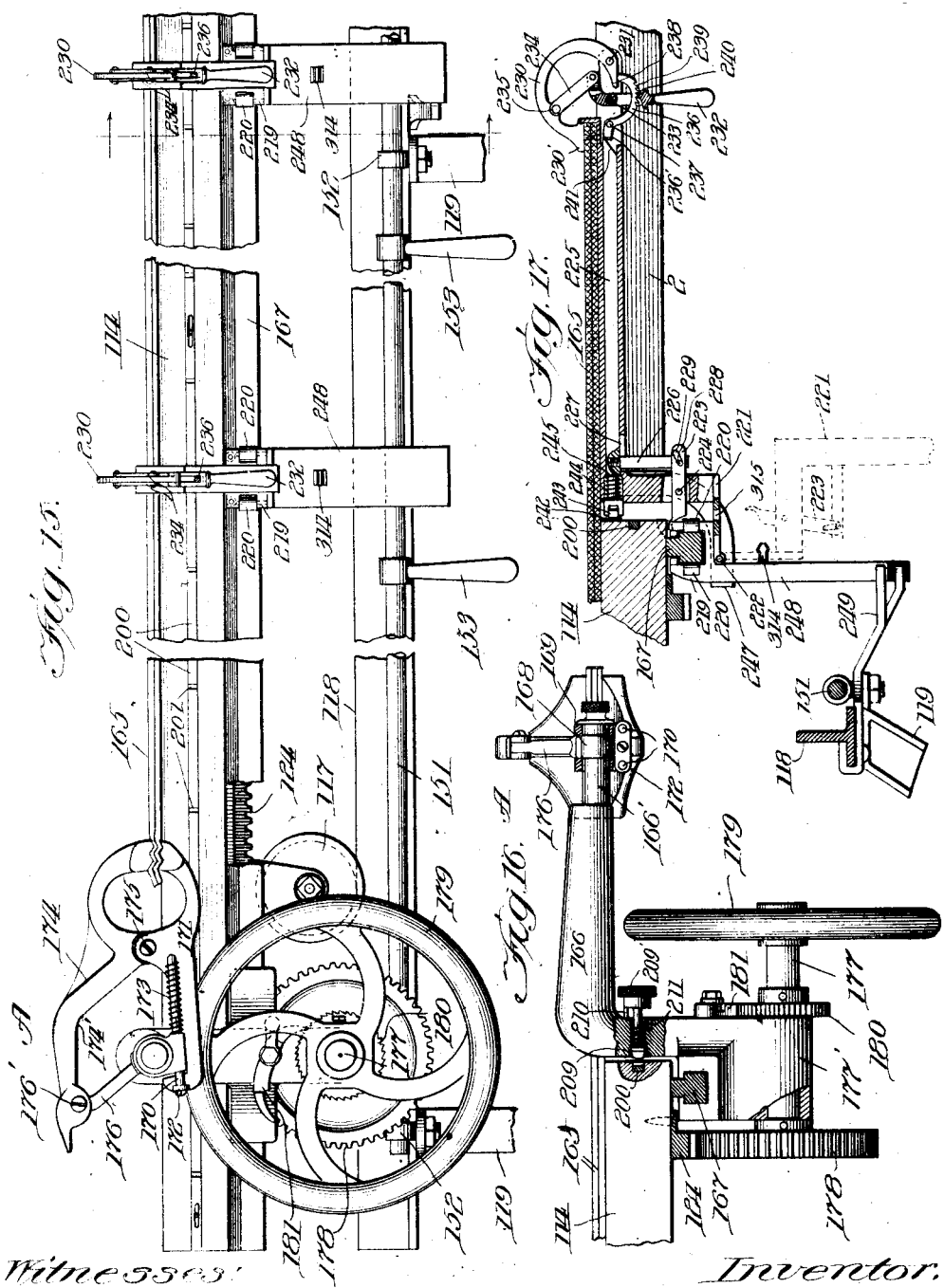

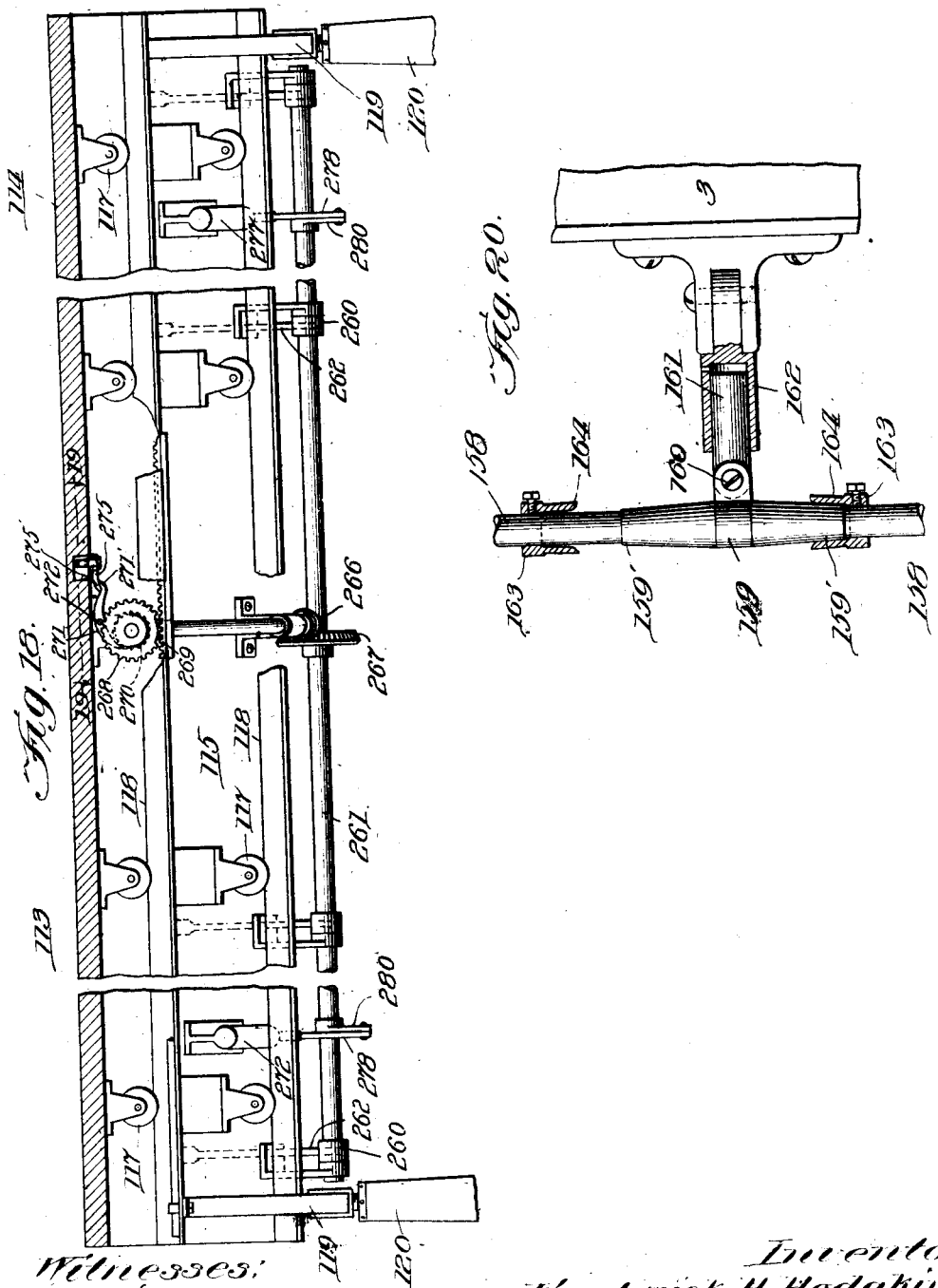

F. H. HODGKINS.
TEXTILE SEWING MACHINE.
APPLICATION FILED JUNE 1, 1909.
1,052,481.
Patented Feb. 11, 1913.
11 SHEETS—SHEET 9.
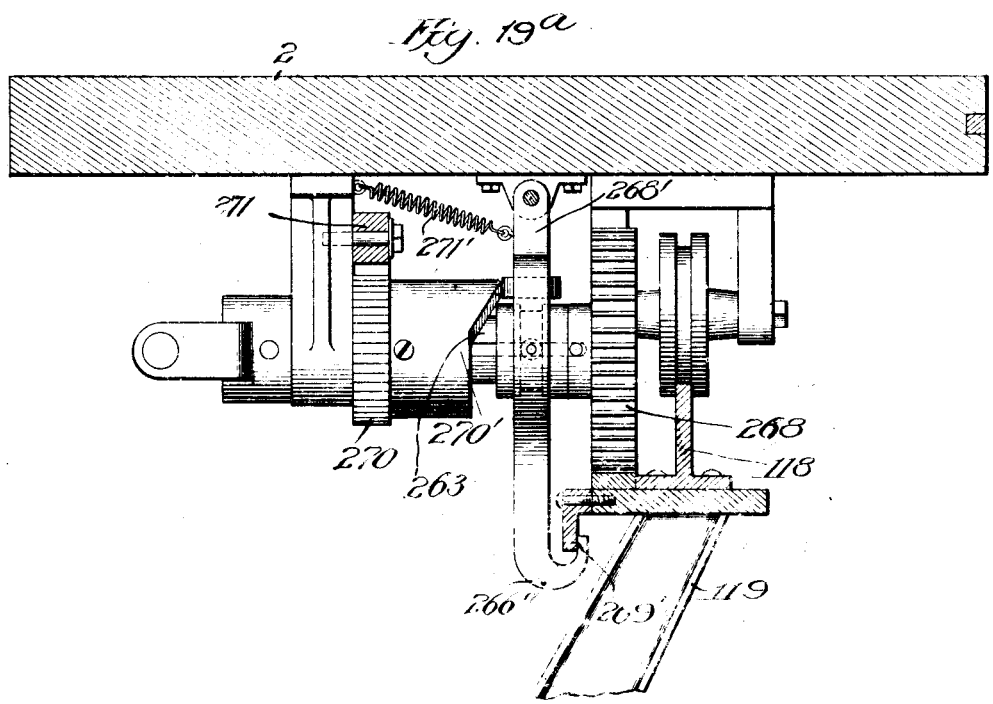
Fig. 19ᵃ
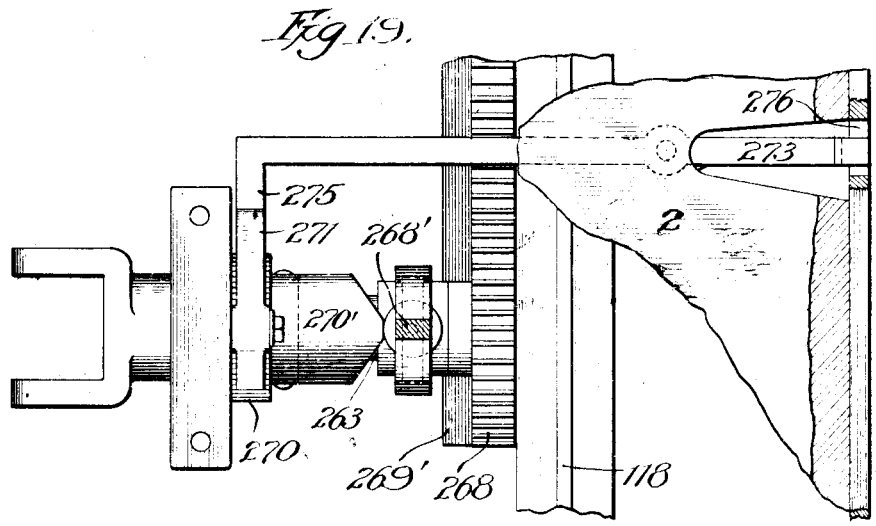
Fig. 19.
Witnesses:
Inventor:
Frederick H. Hodgkins,
By Linthicum Belt + Fuller
Atty s

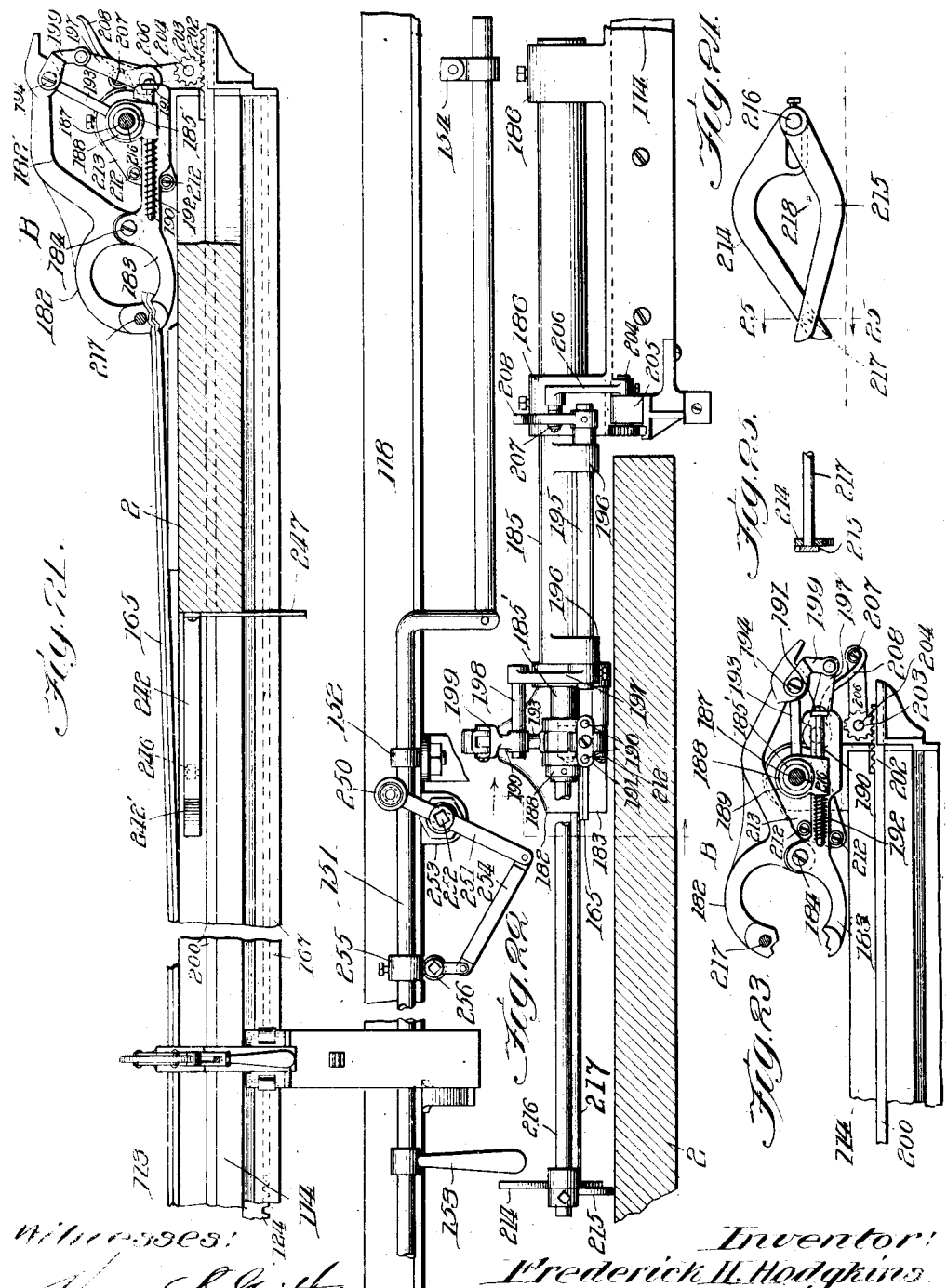

F. H. HODGKINS.
TEXTILE SEWING MACHINE.
APPLICATION FILED JUNE 1, 1909.
1,052,481.
Patented Feb. 11, 1913.
11 SHEETS—SHEET 11.
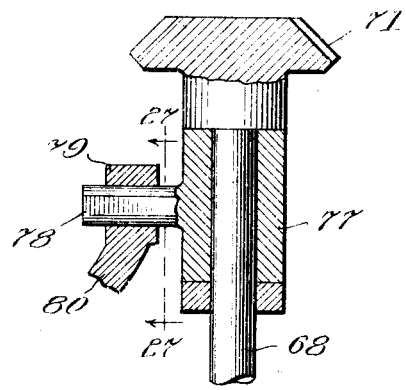
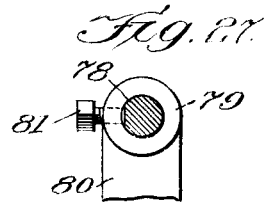
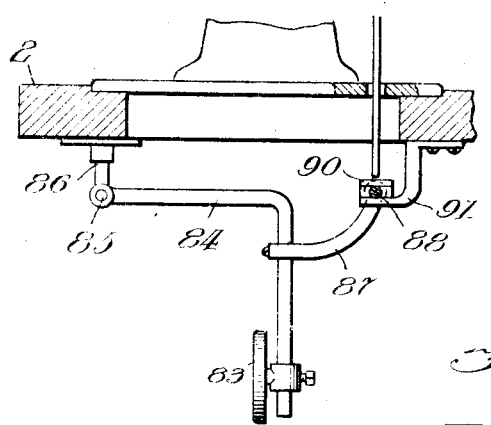
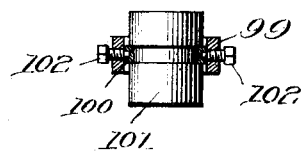
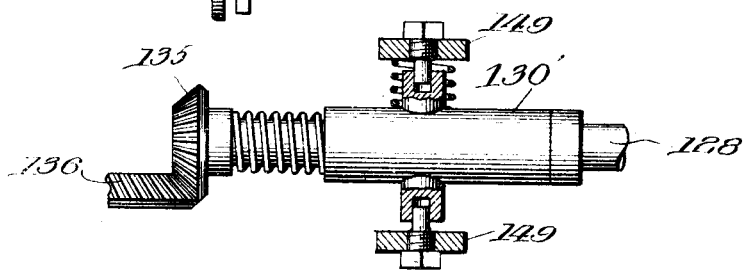
Witnesses.
Harry S. Gaither
M. A. Kiddo
Inventor:
Frederick H. Hodgkins
by Linthicum Belt & Fuller
atty

UNITED STATES PATENT OFFICE.

FREDERICK H. HODGKINS, OF CHICAGO, ILLINOIS.

TEXTILE-SEWING MACHINE.

1,052,481. Specification of Letters Patent. Patented Feb. 11, 1913.

Application filed June 1, 1909. Serial No. 499,490.

*To all whom it may concern:*

Be it known that I, FREDERICK H. HODGKINS, a citizen of the United States, residing at Chicago, in the county of Cook and State of Illinois, have invented new and useful Improvements in Textile-Sewing Machines, of which the following is a specification.

This invention relates to certain novel improvements on the machine covered by my Patents No. 793,074 granted June 27, 1905, and No. 881,122 granted March 10, 1908 and its object is, primarily, to facilitate handling the material, to improve the work and to increase the rapidity of operation of the machine.

Another object of the invention is to insure a constant relative movement between the stitching machine and the material so as to produce an even and uniform stitch and avoid irregular work and the liability of breaking the thread and needle.

Another object of the invention is to transmit the motive power to the stitching machine and to the carriage carrying the material or work through a single transmission to thereby obtain a synchronous movement and positive coöperation of the parts.

Further objects of the invention are to make the carriage for the material and the stitching machine movable independently of each other in either direction; to operate the carriage and the stitching machine, or either, from the platform in front of the stitching machine, or from any position relative to the carriage; to provide improved means for releasing the end clamps sustaining the material whereby they may be released from any position relative to the work and both by the same means; to provide means for sustaining the material between the end clamps for the purpose of preserving the match of the material and holding it in proper position for the needle, and to automatically release said means as they reach the stitching machine; to hold the sewed material in place on the carriage by a foot board which is automatically released when required to discharge the material from the carriage and which is automatically returned to normal position on the return movement of the carriage; to provide auxiliary sustaining means to prevent the free edge of the material from gathering under the seam being sewed on the forward movement of the carriage; to provide means for detecting a lapse in the seam and automatically stopping the machine; to provide means for supporting a mattress or other work in horizontal position on the carriage; and to improve the general and detail construction of the machine to facilitate an improved operation thereof.

My machine can be used for a great variety of purposes in original and repair work, such as sewing carpets, carpet rugs, and more particularly, sail cloth, awnings, tents, shade cloth, mattresses, blankets, automobile tops and any other work in which the material must be carried to the needle mechanically and automatically in a movement bearing a fixed relation to the operation of the needle.

The invention may be embodied with any suitable stitching machine with one or more needles and for sewing straight selvage or raw edge seams, strap seams, cut-offs, or miters.

In the accompanying drawings I have illustrated one embodiment of the invention and referring thereto Figure 1 is a transverse sectional view through the carriage showing the stitching machine and the transmission in elevation. Fig. 2 is an elevation, partly in section, showing parts of the transmission. Fig. 3 is a sectional view of the transmission on the line 3—3 of Fig. 2. Fig. 4 is a sectional view of the transmission on the line 4—4 of Fig. 9. Fig. 5 is a detail plan view showing the device which detects a lapse in the seam. Fig. 6 is a detail plan view showing the strap seam gage. Fig. 7 is a sectional view on the line 7—7 of Fig. 6. Fig. 8 is a sectional view on the line 8—8 of Fig. 5. Fig. 9 is an elevation, partly in section, of the transmission looking in the direction of the arrow at the left of Fig. 4. Fig. 10 is a detail enlarged view showing the adjustable connection between the rod 97 and pitman lever. Fig. 11 is a sectional view on the line 11—11 of Fig. 10. Fig. 12 is a detail enlarged plan view, partly in section, of the variable speed mechanism and flexible bearing. Fig. 13 is a detail enlarged elevation, partly in section, of the flexible bearing for the variable speed mechanism. Fig. 14 is a sectional view on the line 14—14 of Fig. 12. Fig. 15 is a side elevation of the rear end of the carriage. Fig. 16 is an end view, partly in section, of the rear end clamp and the means for operating the rod for releasing the forward clamp. Fig. 17 is a transverse sectional view of the carriage showing one of the side matching clamps. Fig. 18 is a side elevation of the intermediate part of the carriage, between the end views Figs. 15 and 21, showing the table in section. Fig. 19 is a detail enlarged sectional view on the line 19—19 of Fig. 18. Fig. 19ᵃ is a sectional elevation of the mechanism disclosed in Fig. 19. Fig. 20 is a detail enlarged view, partly in section, showing the means for yieldingly locking the auxiliary starting and stopping devices. Fig. 21 is a side elevation of the forward end of the carriage, shown in section, taken on the line 21—21 of Fig. 22. Fig. 22 is a forward end elevation of the carriage showing the stitching machine table in section. Fig. 23 is a detail view showing the forward clamp in open position. Fig. 24 is a detail view of the auxiliary clamp. Fig. 25 is a sectional view on the line 25—25 of Fig. 24. Fig. 26 is a detail sectional view illustrating the adjustable bearing for the upper end of the stitching machine head shaft. Fig. 27 is a detail sectional view on the line 27—27 of Fig. 26. Fig. 28 is a detail view, partly in section, showing parts of the presser foot operating mechanism. Fig. 29 is a detail view, partly in section, showing the connection between the clutch shaft and the yoke 99. Fig. 30 is a detail view partly in section showing the adjustable bearing for the upper end of the shaft 128.

Referring to the drawings, 1 designates a stitching machine which, as before stated, may be of any suitable character adapted for the work which it is desired to do. The stitching machine is mounted on a table 2 which is supported on leg frames 3 mounted upon a platform 4. The platform is mounted on grooved wheels 5 which travel on tracks 6. The parts just described, with the exception of the stitching machine, constitute the stitching machine carriage and provision is made for propelling the carriage on the tracks as hereafter described (Fig. 1).

I employ a motor 7, or any other suitable source of power, and motion is communicated from the motor by a belt 8 to a driven pulley 9 on the main drive shaft 10 supported in bearings 11 adjustably mounted on the leg frames 3. The shaft 10 carries a bevel gear 12 which drives a bevel gear 13 on the variable speed shaft 14 which is supported at one end in the bearing 15 (Fig. 3). The bearing 11 for the main drive shaft 10 and the bearing 15 for the variable speed shaft 14 are both supported on a bracket 16 (Fig. 2) which is adjustably mounted on the adjacent leg frame of the stitching machine carriage. The variable speed shaft is provided with universal joints 17 and an intermediate telescopic joint which provides for a limited extension and contraction lengthwise of said shaft. This joint comprises a socket member 18 and another member 19 (Fig. 3) which works in the socket member and is provided with a stud 19' arranged in the slot 18' of the socket member. Thus the two parts of the shaft are keyed to rotate together while at the same time they are relatively movable lengthwise. The other end of the variable speed shaft 14 is supported in a floating bearing illustrated in Figs. 3, 9, 12 and 13. This floating bearing comprises a frame 20 to receive the shaft and pivotally mounted at 20' on an arm 21 which is supported on the adjustable standard 22 (Figs. 1, 9). The arm 21 has side projections 21' and springs 22 are interposed between said projections and the frame 20 (Fig. 13). Adjustable stops 23 are also provided on these projections to limit the adjustment of the bearing, thus making the bearing self centered. The float bearing 20 may consist of a sectional frame, as shown, or the entire frame may be made in one casting if desired.

The variable speed shaft 14 is provided with a bore 24 and oppositely disposed slots 25, 26, at one end (Figs. 12, 13) and a slidable shaft 27 is arranged to travel in this hollow end of the variable speed shaft and is provided with a double end roller key 28 which travels in the slot 26 and a flat beveled edge operating key 29 which travels in the slot 25. The ends 29 of the key project beyond the periphery of the shaft 14 and are inclosed in a collar 30 which is movable on the shaft 14 lengthwise thereof. This collar is made in two over-lapping parts 30', 30'' and it has an interior peripheral groove 31 to receive the ends of the key 29 and form also an oil pocket. The two parts of the collar are rigidly secured together by screws 32 (Fig. 12). The collar 30 is shifted lengthwise on the shaft 14 by a yoke lever 33 (Fig. 9) which is rigidly mounted on the shaft 34 supported in the arms 21. A link 35 connects the yoke lever 33 with an operating lever 36 which is pivotally mounted on the brake shaft 37 and is provided with a handle 38. The upper free end of the operating lever carries a spring-pressed detent 39 (Fig. 4) which is adapted to engage notches 40 in an indicator plate 41 mounted on the support of the friction shaft (Fig. 3).

The driving pinions 42, 42' and 42'' (Figs. 12, 13), are loosely mounted on the variable speed shaft 14 and they are adapted to be separately locked to said shaft by the key 28 on the slidable shaft 27 which in turn is keyed to the shaft 14 by the key 29. The key 28 makes locking engagement with slots 43 in the head 44 of any one of the pinions.

42 is the low speed pinion, 42″ the high speed pinion and 42′ the intermediate speed pinion. The slidable shaft is operated by the lever 36, as hereinbefore described, and the key 28 is projected forward or backward into locking engagement with either of the pinions as indicated by the lever 36 on the indicator plate, and locked in that position by engagement of the detent with the notches in said plate. In projecting the key forward into locking engagement with the high speed pinion 42″ it must first pass through the pinions 42 and 42′, and to facilitate the movement of the key in both directions through these two pinions I prefer to provide the key with rollers, as shown, and provide both ends of the hub of each pinion with cam faces 45 (Fig. 12). When the key 28 is moved into operative engagement with the cam on the hub of one pinion it will cause said pinion to revolve and as the key is projected forward coincident with the rotation of the pinion it will soon find its seat in the slots 43 to lock the pinion to the variable speed shaft. If it is desired to lock the key with one of the other pinions the movement thereof may be continued through one pinion to the other without interruption, and this movement may be made in either direction as required. I have illustrated three different speed pinions and this number may be increased or diminished as desired without departing from my invention. Driving members 46 are loosely mounted on a hollow shaft 47 (Fig. 3) which is supported on yielding bearings 48 (Fig. 4) mounted on the adjustable standard 22. The driving members are provided on their opposing faces with concentric bevel gears 49, 49′, 49″ which mesh respectively with the bevel driving pinions 42, 42′ and 42″. A slidable clutch shaft 50 is arranged in the hollow shaft 47 and is provided with a transverse pin 51 which projects through slots 47′ in the shaft 47 and locks the friction member 52 to the clutch shaft. The friction member has its ends beveled at 53 to make frictional engagement with the seats 54 on the driving members and the friction member is centered relative to the driving members by springs 55 located on the hollow shaft between the friction member and the driving members. This constitutes the friction clutch whereby the movement is transmitted at the desired speed from the motive power to the clutch shaft 50, and thence to the stitching machine and the material carriage.

A stitching machine driving gear 56 is loosely mounted on the hollow shaft 47 and it is provided with a toothed clutch member 57 (Fig. 3). A movable clutch member 58 is secured to the clutch shaft 50 by a pin 59 projecting through slots 60 in the hollow shaft. The clutch members 57 and 58 are arranged in such relation to each other and to the friction member 52 and the driving members 46, that both clutches will be thrown simultaneously, the toothed clutch, however, being engaged before the friction clutch is engaged. The gear 56 drives a pinion 61 on a stitching machine drive shaft 62 which is mounted at one end in a flexible bearing 63 carried by an arm 64 (Fig. 1) mounted on one of the flexible bearings 48 (Fig. 4). The other end of the shaft 62 is mounted in a bearing 65 carried by a bracket 65′ suspended from the stitching machine table 2 and adjustably secured thereon in any suitable manner. The drive shaft 62 is preferably provided with two universal joints 66 and it is made telescopic at 67 to provide for the lengthwise adjustment thereof as required. A stitching machine head shaft 68 is provided at one end with a bevel gear 69 which meshes with a bevel gear 70 on the shaft 62 and at its other end with a bevel gear 71 which meshes with a bevel gear 72 on the needle bar shaft 73 (Fig. 1). This shaft 68 is provided with universal joints 74 and 75 and it is also made telescopic at 76, being in all substantial respects identical in construction with 73 (Fig. 1). This shaft 68 is provided with ed at the top in a bearing 77 provided with a lateral stud 78 which enters an eye 79 in the bracket 80 mounted on the stitching machine. This stud is secured in the eye of the bracket by a set screw 81 and the stud is provided with a flat face to be engaged by the set screw whereby the bearing is properly centered for the shaft. The shaft 68 is supported at its lower end in a bearing 82 which is adjustably mounted on the bracket 65′. The knuckle joints are provided in the shaft 68 so that the stitching machine head may be swung back to horizontal position for repairs, or adjustment, or oiling, without necessitating the disconnection of any of the driving parts, and, indeed, the stitching machine may be run in this horizontal position in repairing if desired. The stitching machine may have a single needle or a plurality of needles as hereafter described.

I provide means whereby the ordinary presser foot of the stitching machine may be operated by a forward pressure of the knee of the operator. This means comprises a presser plate 83 mounted on the lower end of a lever 84 which is pivotally connected at 85 to a bracket 86 on the stitching machine table (Fig. 1). An arm 87 is adjustably secured on the lever 84 and is engaged at its rear end with the free end of a lift lever 88 which is pivotally connected at its other end to the bracket 65′. A rod 89 connected to the usual presser foot operating devices of the stitching machine is provided at its lower end with a foot 90 which rests upon the lift lever 88. A stop 91 fastened to the table 2 is arranged to limit the downward movement of the lift lever. When the presser plate 83 is pushed backward by the knee of the operator the lever 84 will be swung on its pivot and this will move the rear end of the arm 87 upward, thereby lifting the lever 88 which in turn lifts the rod 89 to operate the presser foot of the stitching machine. It will be found very convenient to operate the presser foot by a forward movement of the knee applied to the presser plate 83 when the treadle, hereafter described, is operated to apply the power to the machine.

A treadle 92 is pivotally mounted at 93 on the platform 4 of the stitching machine carriage and it is connected on opposite sides of its pivot by pitman rods 94 with a pitman lever 95. The rods 94 are made adjustable by means of turn-buckles 94' and the pitman lever 95 passes through the brake shaft 37 and is adjustably secured therein by a set screw 96 (Figs. 9, 11). Motion is transmitted from the pitman lever 95 to shift the clutch shaft 50 lengthwise by connections between the pitman lever and the clutch shaft of the nature of a bell-crank lever. These connections comprise a rod 97 adapted to be engaged by the pitman lever and pivotally engaged at its upper end 97' with the rocker arm 98 which is fulcrumed at 98' on the standard 22 (Figs. 1, 4, 9). A yoke 99 is made integral with the rocker arm 98 and this yoke incloses an oblong collar 100 which is arranged in a grooved bearing 101 at one end of the clutch shaft 50. The collar 100 is divided so that it can be arranged in the yoke and the two parts of the collar are secured to the yoke by set screws 102 (Fig. 9). It will readily be understood that when the pitman lever is operated by the treadle the yoke 99 will be shifted laterally to adjust the clutch lever lengthwise and throw or release the clutches. The friction clutch is a double clutch and it will be observed that the clutch lever may be shifted to release both the friction clutch and the stitching machine clutch or to release the stitching machine clutch and throw the friction clutch to reverse the movement of the material carriage. Thus the stitching machine clutch is made to produce a forward movement only whereas the friction clutch is made to produce a forward or reverse movement, the reverse movement only taking place when the stitching machine is at rest.

To stop the machine instantly at any time I provide a brake device which operates automatically on the friction member of the friction clutch. This brake device comprises a shoe 103 adapted to engage the friction member 52 and is mounted on a post 104 (Figs. 1–4). This post is guided in a sleeve 105 which is mounted on the standard 22, and the sleeve incloses a spring 106 which operates against a shoulder 105' on the post to normally lift the post and apply the brake. A brake release device 107 is rigidly mounted on the brake shaft 37 and it is provided with two toes 108, 108' which engage a plate 109 adjustably mounted on the lower end of the post 104. When the pitman lever 95 is operated, as before mentioned, the release device 107 will rock with the brake shaft and one of the toes 108, 108' will depress the plate 109 to release the brake shoe from engagement with the friction member. When the treadle is operated to throw both clutches the toe 108 will depress the plate 109; when the treadle is operated to release the stitching machine clutch and shift the friction member to produce a return movement of the material carriage the toe 108 will depress the plate 109; when the clutches are both released the brake release device 107 will be centered in neutral position by the spring 106 (Fig. 4) and also by the springs 55 (Fig. 3).

I provide for a lost motion between the pitman lever 95 and the clutch shaft to insure the release of the brake device before motion is transmitted to the clutch shaft and also to permit the whole transmission to be depressed without affecting the operation of the brake. This lost motion is provided in the connection between the rod 97 with the pitman lever (Figs. 10, 11). A roller 110 is mounted on the lower end of the rod 97 and is arranged to work in an elongated pocket 111 formed in the pitman lever 95. Set screws 112 are carried by the pitman lever and project into this pocket whereby the movement of the roller end of the rod 97 relative to the pitman lever may be adjusted as required. This lost motion provided in the pocket 111 enables the pitman lever 95 to swing in a limited arc without communicating any movement to the clutch shaft, so that the brake device may be released before the power is applied and also so that the brake device may be applied before the power is cut off.

The material carriage designated generally 113 comprises a table consisting of a horizontal section 114, and an inclined section 115 and a foot board 116. This carriage is provided with a plurality of grooved rollers 117 which travel on tracks 118 supported on arms 119 mounted on standards 120 which are made vertically adjustable in any suitable manner. A gear 121 is mounted on a shaft 122 which is journaled in the yielding bearings 48 (Fig. 4) and this gear is driven by a pinion 123 on the hollow shaft 47 and meshes with a toothed rack 124 on the horizontal section 114 of the material carriage. By this means the material carriage may be moved relatively to the stitching machine carriage and the construction is such that the material carriage will carry the work to the needle at the proper relative speed to the operation of the stitching machine.

The transmission mechanism may be disconnected from the material carriage so that the latter can be operated independently of the stitching machine while the power is on or off. For this purpose I provide a pedal lever 125 (Fig. 1) which is mounted on the standard 22 in any suitable manner (Fig. 9) and is connected by a rod 126 with one of the yielding bearings 48 at 127 (Fig. 4). By operating the pedal lever 125 the entire transmission mechanism can be pulled down to disengage the driving gear 121 from the rack 124 so that the material carriage will be entirely disconnected from the transmission mechanism and the stitching machine carriage. This will permit the stitching machine carriage and the material carriage to be adjusted in either direction independently of each other and it does not interfere in any way with the operation of the stitching machine.

When the material carriage is disconnected from the rest of the machine, in the manner just described, the power may be employed, if desired, to move the stitching machine carriage forward or backward. This is accomplished by connecting the transmission with traction wheels which travel on tracks 6 (Fig. 2). A telescopic shaft 128 having universal joints 129 is journaled in bearings 130, 130', on the stitching machine carriage. This shaft is provided at its lower end with a worm 131 which drives a worm gear 132 rigid on shaft 133 (Fig. 1). The latter shaft carries two grooved traction wheels 134 which travel on the tracks 6. The shaft 128 carries at its upper end a bevel pinion 135 which is arranged to mesh with a bevel gear 136 on the friction member 52 (Figs. 3, 30). A spring 135' on the shaft 128 tends to hold the pinion 135 up into meshing engagement with the gear 136 and a stop 137 on said shaft engages the upper bearing 130 to limit the upward movement of the shaft 128 and register the pinion in proper relation to the gear. A pedal lever 138 is rigidly mounted on a shaft 139 which is supported in bearings on the platform 4 of the stitching machine carriage and this lever operates an angle arm 140 which is pivoted at 141 on said platform and engages a collar 142 on the shaft 128. The lever 138 is secured in adjusted position by engagement with a toothed post 143. A locking bar 144 is slidably mounted in a bracket 145 beneath the platform 4 and its forward end 146 is arranged to engage the teeth of the gear 132 to lock the gear and the carriage against travel. The locking bar is pivotally connected at 147 to an arm 148 rigidly fastened on the shaft 139. In the normal operation of the machine the stitching machine carriage will be locked against travel and in that condition the shaft 128 will be pulled down by the engagement of the arm 140 with the collar 142 to hold the pinion 135 out of operative engagement with the friction member gear 136. When the material carriage is disconnected from the stitching machine carriage, as heretofore explained, and it is desired to move the stitching machine carriage forward or backward the lever 138 is operated to release the arm 140 and permit the spring 135' to move the telescopic shaft 128 upward sufficiently to carry the pinion 135 into operative engagement with the friction member gear 136. Thereupon power may be applied from the transmission to the traction wheels 134 to move the stitching machine carriage forward or backward as desired. When the power is applied to move the stitching machine carriage forward the stitching machine does not operate but when the power is applied to move this carriage rearward the stitching machine will operate unless it is disconnected from the driving mechanism. To allow for the adjustment of the friction member 52 into engagement with one or the other driving member 46 without disengaging the pinion 135 and the gear 136 I mount the bearing 130' so that it may move laterally a limited distance in the bracket 149 as the friction member is adjusted.

In the ordinary operation of the machine the operator sits on the swinging seat 150 (Fig. 1) but he is not confined to this position and I provide controlling means on the supports for the material carriage which may be operated to start or stop the machine from any position. This controlling means comprises a rod 151 (Figs. 15, 18, 21) which is supported in brackets 152 on the arms 119 which support the track rails 118. This rod is moved lengthwise in its supporting brackets by operating any one of a plurality of handles 153 thereon. The forward end of this rod is connected to an arm 154 rigidly mounted on the rock shaft 155 which is supported in an elongated bearing 156 on one of the leg frames 3 (Fig. 4). An arm 157 is rigidly mounted on the rock shaft 155 and is pivotally connected at its free end to a pitman rod 158 which is pivotally connected at its lower end to the treadle 92 (Fig. 9). It will be readily understood that by shifting the controlling rod 151 lengthwise the treadle can be operated through the medium of the rock shaft 155 and the pitman rod 158 in the same manner and for the same purpose as it is operated under ordinary conditions by the foot of the operator.

To lock the clutch throwing mechanism in on or release positions and at the same time permit the mechanism to be operated without necessitating special manipulation of the lock I provide a loose sleeve 159 on the pitman rod 158 (Figs. 9, 20). This sleeve has tapered ends 159' and it is swiveled at 160 to a stud 161 which is movably arranged in a socket member 162 which is fastened to one of the leg frames 3. Locking devices 163 are adjustably mounted on the pitman rod 158 above and below the sleeve 159 and each of these devices comprises a plurality of spring fingers 164 which are directed toward the sleeve. The construction is such that when the pitman rod is moved up or down one of the locking devices will be carried into engagement with the tapered end of the sleeve and the spring fingers of said locking device will engage the sleeve with sufficient friction to temporarily lock the clutch throwing mechanism in that adjusted position. While this lock is sufficient to hold the clutch throwing mechanism in its adjusted position it can be easily broken by applying sufficient power directly on the treadle or indirectly through the controlling rod. The locking sleeve 159 is mounted in the particular manner shown in Fig. 20 to enable it to adjust itself to the inclination and movements of the pitman rod in its upward and downward movement.

The lengths of material 165 are sustained in position stretched taut by a rear clamp A (Figs. 15, 16) and a forward clamp B (Figs. 21, 23). The rear clamp is substantially the same as the corresponding clamp of the machine covered by my Patent No. 793,074. Referring particularly to Figs. 15 and 16 the rear clamp is mounted on a bent arm 166 which is adjustably arranged on a rail 167 fastened to the horizontal section 114 of the table of the material carriage. This arm is turned down at its outer end 166' to receive the sleeve 168. A bearing 169 is mounted on said sleeve and bored to receive the rods 170 which are adapted to slide in said bearings. These rods are preferably made in the form of a yoke which passes through the lower jaw 171 and the ends of which slide in a plate 172 fastened on the rear end of said jaw. Springs 173 are arranged on the rods 170 in front of the bearing 169. The upper jaw 174 is pivotally connected to the lower jaw 171 at 175 and a link 176 is rigidly mounted on the sleeve 168 and is pivotally connected at 176' to the rear end of the pivoted jaw 174. The jaws can be opened to be engaged with the material by pressing the rear end of the upper jaw 174, which swings said jaw on its pivot 175, and to hold the jaws open I provide the jaw 174 with an arch 174' so that the pivot 176' of the upper jaw can be pressed down beyond a center line drawn through the turned-down end 166' of the arm 166 and the pivot 175. To adjust the rear clamp for stretching the material I provide a shaft 177 which is supported in a bearing 177' on the arm 166 and carries a gear 178 which meshes with the rack 124. A hand wheel 179 is mounted on the shaft 177 for operating the shaft and gear. A ratchet wheel 180 is also mounted rigidly on the shaft 177 and a pawl 181 is pivoted on the arm 166 to engage said ratchet wheel for holding the clamp in its adjusted position.

The forward clamp B (Figs. 21-23) is made very much like the rear clamp just described and comprises the upper jaw 182 and the lower jaw 183 which are pivotally connected at 184. A straight arm 185 is adjustably mounted in bearings 186 on the forward end of the horizontal section 114 of the material carriage. This arm is turned down at 185' and is bored at 187 for a purpose hereafter described. A sleeve 188 is mounted on the part 185' of the arm and a bearing 189 is mounted on the sleeve. Rods 190 are slidably arranged in said bearing and are connected at their rear ends by a plate 191. These arms are made in the form of a yoke which passes through the lower jaw 183, as in the rear clamp, and springs 192 are arranged on the rods behind the bearing 189. The plate 191 is fastened to the jaw 183. A link 193 is rigidly fastened to the sleeve 188 and pivotally connected at 194 to the jaw 182. The forward clamp can be operated by hand, like the rear clamp, by depressing the forward end of the upper jaw 182 and I also provide this jaw with an arch 182' so that the pivot 194 may be depressed below a center line drawn through the part 185' of the arm 185 and the pivot 184, to hold the jaws open. I also provide means for opening the jaws of the forward clamp by operating the rear clamp, to release the material. This means comprises a rock shaft 195 supported in bearings 196 on the arm 185 and carrying a rigid arm 197. A finger 198 is fastened rigidly to the outer end of the arm 197 and this finger is pivotally connected by a link 199 to the pivot 194. A rod 200 is slidably mounted in the edge of the horizontal section 144 of the material carriage and is provided with a plurality of notches 201. This rod is provided at its forward end (Fig. 23) with a toothed rack 202 and a pinion 203 engages said rack and is carried by a shaft 204 supported in a bearing 205 on the table of the material carriage (Fig. 22). An arm 206 is rigidly mounted on the shaft 204 and carries an anti-friction roller 207 which is arranged to engage a finger 208 rigidly mounted on the shaft 195. A spring-pressed dog 209 is slidably arranged transversely in the rear clamp arm 166 (Fig.

16) and is adapted to be thrust forward by a spring into engagement with a notch in the rod 200. Then by adjusting the rear clamp rearward the rack 202 will operate the gear 203 to swing the arm 206 downward and depress the finger at 208 thereby rocking the shaft 195 and causing the arm 197 and finger 198 to depress the forward end of the jaw 182 to open the jaws of the forward clamp. A stud 210 is arranged on the head 209' of the dog 209 to engage a socket 211 in the arm 166. Normally the dog is withdrawn from operative engagement with the notched rod and the head will be turned to engage the stud 210 with the arm as shown in Fig. 16. When it is desired to engage the dog with the notched rod the head will be turned so that the stud may enter the socket 211. In the construction shown and described the rear clamp may swing by gravity on its supporting arm to a vertical position when not engaged with the material but this is not important except that it allows the material carriage to travel forward a greater distance without engaging the stitching machine carriage. In order that the jaws of the clamp may be opened by manipulating the rear clamp, as just described, it is necessary that the rear clamp should not be permitted to swing and should be capable only of a forward and backward sliding movement. For this reason I provide guide rollers 212 to engage the lower jaw 183 and these guide rollers are mounted on a support 213 which is adjustably mounted on the part 185' of the arm 185.

To support the free edge of the material being sewed after it passes through the stitching machine I provide an auxiliary clamp adjacent to the forward clamp with which the material may be engaged. This clamp comprises an upper jaw 214 and a lower jaw 215 (Figs. 22, 24). The upper jaw is slidably mounted on a rod 216 which is secured in the bored end 185' of the arm 185. The lower jaw is rigidly mounted on the rod 216. A rod 217 (Fig. 25) is engaged with the upper jaw 182 of the forward clamp (Fig. 21) and with the free end of the upper jaw 214 of the auxiliary clamp. By this means the upper jaw 214 will be operated simultaneously with the operation of the upper jaw 182 of the forward clamp and the slidable connection of said jaw 214 with the rod 216 enables said jaw to slide forward or backward with the forward clamp. The material may be engaged with the auxiliary clamp by pulling it through sidewise in the opening 218 between the jaws without affecting the forward clamp and then slipping it forward between the ends of said jaws. The material is held taut between the rear and forward clamps A and B by locking the rear clamp to the rack. The springs on these clamps tend to keep the jaws closed and the more the material is stretched by adjusting the rear clamp the tighter the jaws will be clamped on the material. The upper jaw 214 of the auxiliary clamp operates in unison with the upper jaw 182 of the forward clamp and thus closes the auxiliary clamp.

While the material can be stretched taut between the sustaining clamps A and B it is desirable to provide supplemental means for clamping the material between the end clamps not only to sustain the material but to hold it properly matched. For this purpose I provide a plurality of supplemental or matching clamps which are supported on the material carriage and are movable relatively thereto. In the drawings I have shown one of these clamps in detail in Fig. 17 and referring thereto it comprises a shoe 219 provided with anti-friction rollers 220 and adapted to travel on rail 167. A frame 221 is hinged to the shoes at 222 and this frame is normally sustained in horizontal position, as shown in full lines in Fig. 17, by a dog 223 which is pivotally mounted at 224 on the frame and is arranged to engage the shoe, as shown. A rod 225 is slidably arranged in the frame 221 and a post 226 is rigidly secured to said rod and projects downward through a slot 227 in the frame and is provided with a pin 228 which operates in an inclined slot 229 in the dog. A curved jaw 230 is pivotally mounted at one end at 231 on the frame 221 and its other end 230' is arranged to clamp the edge of the material between itself and the frame 221. This clamp is operated by a handle lever 232 which is pivotally mounted at 233 on the frame 221 and is pivotally connected by a link 234 with the jaw at 235. A locking device 236 is pivoted at 237 on the frame 221 and the end of this device engages a heel 238 on the jaw 230. This locking device is provided with notches 239 and the handle has a tooth 240 which engages the notches. The end 241 of the sliding rod 225 adjacent to the jaw 230 is beveled to engage the heel 236' of the locking device 236 so that when this rod is pushed to the right in Fig. 17 it will swing the locking device on its pivot thereby releasing it from engagement with the tooth 240 and at the same time by engagement with the heel 238 swing the jaw 230 to open position. The rod 225 is moved to the right in Fig. 17 to operate the jaw 230 by a tripper 242 which is secured to the rear edge of the stitching machine table (Fig. 21). A roller 243 on the end of the rod 225 is arranged to engage this tripper and the latter is beveled at its end 242' to form a cam track on which the roller travels. As the roller travels up this cam track the rod 225 will be moved to release the clamping jaw 230 as before described. A spring 244 is arranged on the rod 225 at the lower end thereof to engage a shoulder 245 on the frame 221 to project the rod 225 normally to the left in Fig. 17 so that the clamping jaw 230 may be locked in clamping position. The movement of the rod 225 may be limited by engagement of the post 226 with the end walls of the slot 227. The tripper 242 projects from the stitching machine table alongside of the adjacent edge of the material carriage table and I provide a roller 246 on the tripper to engage the table of the material carriage when pressure is applied to space the tripper from said table.

When the tripper operates the sliding rod 225 as just described the post 226 disengages the dog 223 from the shoe 219 and this permits the frame 221 and the parts carried thereby to swing from horizontal position, after the clamping jaw 230 has been released, to a vertical position, as indicated in broken lines in Fig. 17, where it will engage a stop arm 247 fastened to the stitching machine. This stop arm arrests the movement of the supplemental clamp while the material carriage continues its forward movement. As before stated I may employ a plurality of these supplemental clamps and hence I make the tripper 242 project rearward sufficiently from the stop arm 247 (Fig. 21) to permit the supplemental clamps to be nested one against the other with the first against the stop, the cam 242' of the tripper being located sufficiently in rear of the stop 247 to permit the last or rear supplemental clamp to be tripped. Each shoe 219 is provided with a depending arm 248 which is adapted to engage a stop 249 fastened to one of the arms 119 (Fig. 17). The supplemental clamps are provided with arms 248 of different lengths to engage correspondingly positioned stops 249 so that as they are carried back with the material carriage on its return movement they will be stopped in their proper relative position.

To limit the forward movement of the carriage at any desired point I provide a tripper device comprising a roller 250 (Fig. 22) which is arranged in the path of the gear 178 and is carried by a lever 251 pivotally mounted at 252 on a bearing 253 which is adjustably secured on the track 118. This lever 251 is connected by a link 254 with a collar 255 adjustably fastened on the controlling rod 151. A roller 256 is suitably mounted on the collar 255 to engage the underside of the track 118. The stop device may be set to be operated by the gear 178 in any desired position and when the lever 251 is swung by engagement of said gear with the roller 250 the controlling rod 151 will be moved lengthwise to throw the friction member of the transmission mechanism out of engagement with the driving member. The brake device works automatically, as heretofore explained, and when the friction member is shifted, as just described, the machine will be brought to rest automatically.

To limit the rearward movement of the carriage I provide a stop device 257 which is adjustably fastened on the rail 167 to engage an arm 258 on the rock shaft 155 (Fig. 4). When this stop engages the arm the friction member of the transmission mechanism will be automatically operated in the same manner as just described.

The foot board 116 is hinged at 259 to the inclined section 115 of the material carriage table. Arms 260 are rigidly mounted on a shaft 261 which is supported in suitable bearings on the material carriage and links 262 are pivotally connected at their ends to said arms and to the foot board (Fig. 1). Means for automatically swinging the foot-board to dump the load and return the foot-board to elevated position are provided and these means comprise a shaft 263 having a universal joint 264 and supported in bearings 265 on the material carriage. This shaft carries at one end a bevel pinion 266 which meshes with a bevel gear 267 on shaft 261. A gear 268 is slidably mounted on the other end of the shaft 263 and is adapted to be operated by a short toothed rack 269 on one of the tracks 118 (Figs. 1, 18). A ratchet wheel 270 on the shaft 263 is engaged by a pawl 271 pivotally mounted on a rod 272 on the bearing 265 and this pawl and ratchet wheel hold the foot-board in elevated position. A lever 273 is pivotally mounted at 274 on the table section 114 and this lever has an arm 275 to engage and operate the pawl 271 (Fig. 19). The engaging faces 271' of the pawl 271 and 275' of the arm 275 are inclined so that when the lever 273 is swung on its pivot to move the arm 275 relative to the pawl 271 the inclined face 275' of the arm will slide on the inclined face 271' of the pawl thereby swinging the pawl on its pivot to release it from engagement with the ratchet wheel. This releases the foot board so that it will swing downward by gravity to dump the load from the material carriage. The lever 273 projects forward through the edge of the table section 114 and through a slot 276 in the rod 200, which, as heretofore explained, is moved lengthwise by the rear clamp to release the forward clamp. After the rod 200 has been moved lengthwise to release the forward clamp a further movement in the same direction will operate the lever 273 to release the foot board. The foot board may be released by operating the lever 273 manually and without affecting the clamps, if desired. To prevent the foot board from swinging downward unrestrained I provide one or more dash pots 277 of simple construction which are supported on the underside of the inclined section 115 of the material carriage (Figs. 1, 18). A link 278 is pivotally connected at one end to the piston stem 279 of each dash pot and to an arm 280 rigidly secured on the shaft 261 so that when the foot board is released and starts to swing downward the piston will be pushed into the cylinder of the dash pot to control the downward movement of the foot board. The foot board is returned to elevated position automatically as the material carriage is returned to initial position. This is accomplished by means of a cam arm 270' which is fastened to the ratchet wheel 270 and is arranged to engage the yoke lever 268' which is pivoted on the underside of the horizontal section 114 of the material carriage and engages a groove 268" in the hub of the gear 268 (Fig. 1). A spring 271" attached to the bearing 265' and the yoke lever 268' pulls the gear 268 normally out of position to mesh with the rack 269, but when the shaft 263 is turned by the foot board swinging down to dumping position the cam arm 270' is moved to engage the yoke lever and push the gear 268 into position to mesh with the rack 269. Then on the return movement of the carriage when the gear 268 engages the rack 269 the shaft 263 will be turned reversely to raise the foot board to elevated position. The cam arm 270' by engagement with the yoke lever 268' holds the gear 268 in position to mesh with the rack 269 but on the return movement of the shaft 263 the cam arm is carried back to initial position, and then to hold the gear in meshing engagement with the rack, against the tension of spring 271" I provide a hook 266" on the yoke lever which engages a lip 269' on the rack 269. While the gear is traveling on the rack the foot board is returned to elevated position and after the gear leaves the rack and the hook 266" passes beyond the lip 269' the gear is moved on the shaft 263 by the spring 271" so that it will not engage the rack on the next forward movement of the material carriage or on any rearward movement of the carriage until the foot board is again released.

The detector for automatically stopping the machine when the stitching machine fails to properly stitch comprises an arm 281 mounted on a stud 282 which is arranged in the socket end 283 of a rod 284 supported in a bracket 285 on the stitching machine carriage (Figs. 4, 5). The stud 282 is provided with a pin 282' which enters a slot 283' in the socket end of the rod 284 to lock the stud and detector arm to said rod so that they will turn together; the detector arm being held in operative position, as shown in Fig. 4, by a spring 286 fastened at one end to the bracket 285 and at its other end to the rod 284. The outer free end of the detector arm 281 is preferably made knife edge to more readily enter between the two layers of the material being sewed to engage the seam 287. The lower end of the rod 282 is provided with a finger 288 which engages a slot 289 in an inclined arm 290 rigidly mounted on the shaft 34 (Fig. 9). This arm 290 carries a grooved roller 291 which is engaged by the link 35. The yoke lever 33 is engaged with the link 35 by a pin 292 which operates in an angular slot 293 in said link. In the normal operation of the machine the pin 292 will be seated in the off-set end 293' of said slot to connect the yoke lever and the link together and a light spring 294 is provided on the yoke lever to hold the parts in this position. But when the stitching machine fails to stitch properly and the spring 286 swings the detector arm and the rod 284 the finger 288 operating in the slot 289 will swing the arm 290 and lift the link to unlock the latter from the pin 292 whereupon a spring 295 on the shaft 34 will throw the yoke lever 33 to carry the slidable key shaft out of operative engagement with the driving pinions 42, 42' and 42" thereby stopping the machine automatically. (Figs. 12, 13.) To readjust the parts to normal position the lever 36 is operated to thrust the link forward so that the pin will again be engaged with the offset end of the slot 293 after which the lever can be operated to move the slidable key shaft into engagement with any one of the pinions. To prevent the detector arm from pushing the material away from the bight gage 296 I provide a star wheel 297 which is adjustably mounted on an arm 298 pivoted at 299 in a bracket 300 on the stitching machine table (Figs. 5, 8). This star wheel is adjusted in an angular position relative to the seam and in engagement with the material so that as the material is fed through the stitching machine the star wheel will tend to feed it sidewise against the detector arm and in this way resist the pressure of the detector arm on the material. The arm 298 has a heel 301 which engages a plate spring 302 fastened to the bracket 300 and this permits the arm to be swung into operative position, as illustrated, where it is held by the spring, or into an inoperative position, as desired.

In Figs. 6 and 7 I have shown a gage for sewing a strap seam. This gage is made in one piece and comprises a plate 303 which is fastened to the stitching machine table immediately back of the needles 304. The plate is bent upon itself in S-shape to form a pocket 305 for one layer 306 of material and a pocket 307 for the other layer 308 of material, these pockets being arranged one above the other so that the edges of the material will be over-lapped as the material is carried to the needles. This strap seam gage is used more especially for the lighter grades of materials.

The standards 22 which support the transmission mechanism are made in the general form of jack screws, the upper part 22′ of which is shaped to form a suitable frame for supporting the different parts of the mechanism. The standards 120 which support the arms 119 for the material carriage are also preferably made in the form of jack screws to facilitate the adjustment of the material carriage relative to the other parts of the machine.

To more conveniently support mattresses, and for other purposes, I provide one or more leaves 309 which are hinged at 310 to the horizontal section 114 of the material carriage and are supported by jointed arms 311 pivotally connected at 312 to the inclined section 115 of the material carriage and at 313 to the leaves 309. These leaves can be folded down against the inclined section 115 or raised to elevated position (Fig. 1) as desired.

To relieve the shock when a matching clamp swings downward out of operative position, as indicated in broken lines in Fig. 17, and to hold it in this position I provide spring detents 314 on the arms 248 which are adapted to enter slots 315 in the matching clamp frame when the latter drops to vertical position. When it is desired to use the matching clamps again they are swung up manually to horizontal position and the jaw 230 is engaged with the material in the manner shown in Fig. 17. These matching clamps are particularly important for holding the material with the figures properly matched and at short intervals between the end clamps.

When it is desired to move the stitching machine carriage independently of the material carriage it will be necessary to disengage the controlling rod on the material carriage supporting frame from the rock shaft 155 which is supported with the power transmission mechanism on the stitching machine carriage and this can be conveniently done at 151′ (Fig. 9).

I have shown and described the stitching machine as comprising a carriage movable independently and relatively to the material carriage but the stitching machine may be arranged permanently in fixed position if desired. My invention provides an automatic machine which may be operated with comparatively little power and at a high rate of speed, while at the same time requiring very little attention. It is so constructed that it can be employed for sewing material of different lengths and the power will be automatically disconnected to stop the machine, whenever the stitching machine fails to operate properly. By loosening the set screw 81 and disconnecting the gear 71 from the gear 72 the stitching machine carriage may be moved forward or rearward without operating the stitching machine.

My invention provides a machine adapted to automatically and mechanically handle and assist in the manufacture of textile fabrics, particularly heavy and bulky textile materials, such as carpets, rugs, large tents, sails, shade cloths, blankets, automobile tops, mattresses, canvas goods, theater curtains, and so forth in a rapid, safe and easy manner, requiring limited attention and manual labor of the operator. The work is not only out of the way of operator and moving mechanism, but is kept positively clean during the many changes in its position necessary in the act of sewing, which is an important feature in textile manufacture. Also several speeds are provided and the permissible quick change of any suitable stitching machine for the different kinds of work to be done. The transmission is positive, yet flexible, in its action with the stitching machine and the traction carriage. The machine is automatic and self-adjusting where most desired.

What I claim and desire to secure by Letters Patent is:

1. In a textile sewing machine of the character described, the combination of a movable carriage for the material, means for moving said carriage, a stitching machine, a movable carriage for the stitching machine, and means for moving the stitching machine carriage independently of the material carriage and parallel with the movement thereof.

2. In a textile sewing machine of the character described, the combination of a movable carriage for the material, a stitching machine, a movable carriage for the stitching machine, and means for moving said carriages in parallel relation, each carriage being movable in either direction, independently of the movement of the other.

3. In a textile sewing machine of the character described, the combination of a movable carriage for the material, a stitching machine, a carriage for the stitching machine, power mechanism for moving the material carriage and operating the stitching machine, means for moving said stitching machine carriage bodily parallel to the movement of the material carriage, and means for disconnecting the power mechanism from the material carriage independently of the stitching machine.

4. In a textile sewing machine of the character described, the combination of a stitching machine, a movable carriage for feeding material to the stitching machine, a stitching machine carriage movable parallel with the movement of the material carriage, and means for operating said stitching machine independently of the movement of the material carriage and of the stitching machine carriage.

5. In a textile sewing machine of the character described, the combination of a reciprocatory carriage for the material, a stitching machine movable parallel with the movement of said carriage, a single transmission mechanism for transmitting power to the material carriage and the stitching machine, and means for disconnecting said carriage from said transmission mechanism without disturbing the operative relation of the stitching machine.

6. In a textile sewing machine of the character described, the combination of a material carriage mounted to move in a right line, a stitching machine, means for moving said machine bodily relatively to the carriage and in a direction parallel with the movement of said carriage, a single power transmission mechanism for the material carriage and the stitching machine, said mechanism comprising clutches for the material carriage and the stitching machine, and mechanism for simultaneously operating said clutches.

7. In a textile sewing machine of the character described, the combination of a movable material carriage, a stitching machine means for moving said machine bodily relatively to the carriage, a single power transmission mechanism for the material carriage and the stitching machine, said mechanism comprising a clutch for the material carriage and a clutch for the stitching machine, and treadle-operated means for throwing said clutches simultaneously.

8. In a textile sewing machine of the character described, the combination of a movable material carriage, a stitching machine, a single power transmission mechanism for the material carriage and the stitching machine, said mechanism comprising a clutch for the material carriage and a clutch for the stitching machine, treadle-operated means for throwing said clutches simultaneously, and hand-operated means independent of the treadle means for throwing said clutches simultaneously.

9. In a textile sewing machine of the character described, the combination of a movable material carriage, a stitching machine, a single power transmission mechanism for the material carriage and the stitching machine, said mechanism comprising a clutch for the material carriage and a clutch for the stitching machine, and hand-operated means on the movable carriage for throwing said clutches simultaneously.

10. In a textile sewing machine of the character described, the combination of a movable material carriage, a stitching machine, a single power transmission mechanism for the material carriage and the stitching machine, said mechanism comprising a clutch for the material carriage and a clutch for the stitching machine, and hand-operated means extending from end to end of the movable carriage for throwing said clutches simultaneously.

11. In a textile sewing machine of the character described, the combination of a movable material carriage, a stitching machine, a single power transmission mechanism for the material carriage and the stitching machine, said mechanism comprising a clutch for the material carriage and a clutch for the stitching machine, and means for operating said clutches to apply or release the power.

12. In a textile sewing machine of the character described, the combination of a movable material carriage, a stitching machine, a single power transmission mechanism for the material carriage and the stitching machine, said mechanism comprising a clutch for the material carriage and a clutch for the stitching machine, and a hand-operated controlling rod connected to said transmission mechanism for operating said clutches.

13. In a textile sewing machine of the character described, the combination of a movable material carriage, a stitching machine, a single power transmission mechanism for the material carriage and the stitching machine, said mechanism comprising a clutch for the material carriage and a clutch for the stitching machine, and a hand-operated controlling rod on the frame of the machine, said rod being movable lengthwise and connected to the transmission mechanism for operating said clutches.

14. In a textile sewing machine of the character described, the combination of a movable material carriage, a stitching machine, a power transmission mechanism comprising a clutch for the material carriage and a clutch for the stitching machine, treadle actuated means for operating said clutches, and hand-operated means on the frame adjacent to the material carriage for operating said treadle means.

15. In a textile sewing machine of the character described, the combination of a movable material carriage, a stitching machine, power transmission mechanism comprising a clutch for the material carriage and a clutch for the stitching machine, means for operating said clutches, and means for locking said clutch operating means yieldingly in on or off position.

16. In a textile sewing machine of the character described, the combination of a movable material carriage, a stitching machine, power transmission mechanism comprising a clutch for the material carriage and a clutch for the stitching machine, means for operating said clutches, a sleeve supported on the frame of the machine, a rod movable endwise in said sleeve and connected to the clutch operating means, and locking devices on said rod to yieldingly engage the ends of the sleeve.

17. In a textile sewing machine of the character described, the combination of a movable material carriage, a stitching machine, power transmission mechanism comprising a clutch for the material carriage and a clutch for the stitching machine, means for operating said clutches, a sleeve having tapered ends and supported on the frame of the machine, a rod movable in said sleeve and connected to the clutch operating means, and yielding locking devices carried by said rod to engage the tapered ends of the sleeve.

18. In a textile sewing machine of the character described, the combination of a movable material carriage, a stitching machine, power transmission mechanism comprising a clutch for the material carriage and a clutch for the stitching machine, means for operating said clutches, a sleeve pivotally mounted on the frame of the machine, a rod movable endwise in said sleeve and connected to the clutch operating means, and locking devices mounted on said rod and having spring fingers to yieldingly engage the ends of the sleeve.

19. In a textile sewing machine of the character described, the combination of a movable material carriage, a stitching machine, power transmission mechanism comprising a clutch for the material carriage and a clutch for the stitching machine, means for operating said clutches, a sleeve pivotally and movably mounted on the frame of the machine and having tapered ends, a rod movable endwise in said sleeve and connected to the clutch operated means, and locking devices adjustably mounted on the rod and having spring fingers to engage the tapered ends of the sleeve to yieldingly lock the clutch operating means in operative position.

20. In a textile sewing machine of the character described, the combination of a movable material carriage, a stitching machine, power transmission means comprising a clutch for the material carriage and a clutch for the stitching machine, treadle actuated means for operating said clutches, hand operated means on the material carriage for operating said treadle actuated means, and means for yieldingly locking said treadle and hand-operated means with the clutches in operative position.

21. In a textile sewing machine of the character described, the combination of a movable material carriage, a stitching machine, a power transmission mechanism comprising a clutch shaft, a clutch on said shaft for the stitching machine, a friction clutch on said shaft for the material carriage, said friction clutch comprising a friction member, a brake device to engage said friction member for stopping the machine instantly when the clutches are released, said brake device comprising a shoe to engage the friction member, a spring-pressed post carrying said shoe, a plate on said post, means for operating said clutch shaft to throw or release the clutches, and a brake release device engaging said plate and operated by the clutch shaft operating means to withdraw the shoe from engagement with the friction member.

22. In a textile sewing machine of the character described, the combination of a movable material carriage, a stitching machine, a power transmission mechanism comprising a clutch shaft, a clutch on said shaft for the stitching machine, a friction clutch on said shaft for the material carriage, said friction clutch comprising a friction member, a brake device to engage said friction member for stopping the machine instantly when the clutches are released, said brake device comprising a shoe to engage the friction member, a spring-pressed post carrying said shoe, a plate on said post, means for operating said clutch shaft to throw or release the clutches, and a brake release device operated by the clutch shaft operating means and comprising two toes adapted to depress said plate and release the shoe from engagement with the friction member.

23. In a textile sewing machine of the character described, the combination of a movable material carriage, a stitching machine, power transmission mechanism comprising a clutch shaft, a clutch for the material carriage, a clutch for the stitching machine, a normally applied brake device, means for operating the clutch shaft and the brake device, and means providing a lost motion in said clutch shaft operating means to insure the release of the brake device before the clutches are thrown.

24. In a textile sewing machine of the character described, the combination of a movable material carriage, a stitching machine, power transmission mechanism comprising a clutch shaft, a clutch for the material carriage, a clutch for the stitching machine, a normally applied brake device, means for operating said clutch shaft and brake device, means for disconnecting the transmission mechanism from the material carriage, and means providing a lost motion in the clutch shaft operating means to enable said transmission mechanism to be disconnected from the material carriage without affecting the brake device.

25. In a textile sewing machine of the character described, the combination of a movable material carriage, a stitching machine, a power transmission mechanism comprising a clutch shaft, a clutch for the material carriage, a clutch for the stitching machine, and means for operating said clutch shaft comprising a pitman lever having a pocket therein, a rod, a roller on the end of the rod arranged to operate in said pocket, and adjusting devices in said pocket to limit the movement of the roller relative to the pitman lever.

26. In a textile sewing machine of the character described, the combination of a movable material carriage, a stitching machine, a single power transmission mechanism for both the material carriage and the stitching machine and comprising a hollow shaft, driving members on the hollow shaft for communicating movement to the material carriage, a driving gear on the hollow shaft for communicating movement to the stitching machine, a clutch for the driving members and a clutch for said gear, and means for operating said clutches simultaneously.

27. In a textile sewing machine of the character described, the combination of a movable material carriage, a stitching machine, a single power transmission mechanism comprising a clutch for the material carriage and a clutch for the stitching machine, a gear operated by said stitching machine clutch, a flexibly mounted drive shaft for the stitching machine operated by said gear, and a flexible head shaft for the stitching machine operated by said drive shaft.

28. In a textile sewing machine of the character described, the combination of a movable material carriage, a stitching machine, a single power transmission mechanism comprising a clutch for the material carriage and a clutch for the stitching machine, a gear operated by said stitching machine clutch, a telescopic stitching machine drive shaft operated by said gear, and a telescopic stitching machine head shaft operated by said drive shaft.

29. In a textile sewing machine of the character described, the combination of a movable material carriage, a stitching machine, a single power transmission mechanism comprising a clutch for the material carriage and a clutch for the stitching machine, a gear operated by said stitching machine clutch, a stitching machine drive shaft operated by said gear, and a stitching machine head shaft operated by said drive shaft, said head shaft having a plurality of universal joints therein to permit the stitching machine to be swung to horizontal position without disconnecting its driving mechanism.

30. In a textile sewing machine of the character described, the combination of a stitching machine, a flexible and telescopic head shaft for the stitching machine, means for driving said head shaft, a bearing for said shaft, a lateral stud on said bearing, a bracket on the stitching machine having an eye to receive said stud, and a set-screw for securing said stud in the eye whereby upon loosening the set-screw the head shaft may be swung out of operative engagement with the stitching machine, said shaft being adapted for sewing machine heads of various heights.

31. In a textile sewing machine of the character described, the combination of a stitching machine, a head shaft, a bearing for said shaft, a lateral stud on said bearing having a flat face, a bracket on the stitching machine having an eye to receive said stud, a set screw in said bracket and engaging said flat face to center the bearing for the shaft, and means for driving said head shaft.

32. In a textile sewing machine of the character described, the combination of a movable material carriage, a stitching machine, a power transmission mechanism comprising a clutch shaft, a clutch for the material carriage and a clutch for the stitching machine, means for operating said clutch shaft, and means providing a lost motion in said clutch shaft operating means.

33. In a textile sewing machine of the character described, the combination of a movable material carriage, a stitching machine, a variable speed power transmission mechanism comprising a clutch for the material carriage and a clutch for the stitching machine, a main drive shaft, and a telescopic variable speed shaft having universal joints therein and operated by said drive shaft.

34. In a textile sewing machine of the character described, the combination of a movable material carriage, a stitching machine, a variable speed power transmission mechanism comprising a clutch for the material carriage and a clutch for the stitching machine, a main drive shaft, a telescopic variable speed shaft having universal joints therein and operated by said drive shaft, and a floating bearing for said variable speed shaft.

35. In a textile sewing machine of the character described, the combination of a movable material carriage, a stitching machine, a variable speed power transmission mechanism comprising a clutch for the material carriage and a clutch for the stitching machine, a main drive shaft, a telescopic variable speed shaft having universal joints therein and operated by said drive shaft, an arm, and a floating bearing for said variable speed shaft, said bearing being pivotally mounted on said arm.

36. In a textile sewing machine of the character described, the combination of a movable material carriage, a stitching machine, a variable speed power transmission mechanism comprising a clutch for the material carriage and a clutch for the stitching machine, a main drive shaft, a telescopic variable speed shaft having universal joints therein and operated by said drive shaft, an arm having side projections, and a floating bearing for said variable speed shaft, said bearing comprising a frame constructed to receive the shaft and pivotally mounted on said arm, springs interposed between the frame and the side projections, and stops for limiting the movement of the frame relative to said arm.

37. In a textile sewing machine of the character described, the combination of a movable material carriage, a rack on said carriage, a stitching machine, a movable carriage supporting said stitching machine, power transmission mechanism mounted on the stitching machine carriage and comprising a gear to mesh with said rack, and a pedal lever connected to said transmission mechanism and adapted to be operated to disengage the gear from the rack.

38. In a textile sewing machine of the character described, the combination of a movable material carriage, a stitching machine, a movable carriage for the stitching machine, power transmission mechanism mounted on the stitching machine carriage and adapted to operate the material carriage and the stitching machine, means for disconnecting said mechanism from the material carriage, and means for applying said mechanism to move the stitching machine carriage.

39. In a textile sewing machine of the character described, the combination of a stitching machine, a movable carriage for said stitching machine, a material carriage, power transmission mechanism adapted to simultaneously operate the stitching machine and move the material carriage, traction wheels on said stitching machine carriage, and manually controlled means for connecting said wheels with said power transmission mechanism whereby to move said stitching machine carriage.

40. In a textile sewing machine of the character described, the combination of a stitching machine, a movable carriage for said stitching machine, a material carriage, power transmission mechanism for feeding said material carriage and operating said stitching machine, traction wheels for said stitching machine carriage, a gear on said transmission mechanism, a drive shaft for said traction wheels, a gear on said drive shaft to mesh with the gear on the transmission mechanism and normally out of engagement therewith, and means for throwing said drive shaft gear into engagement with the transmission gear to move said stitching machine carriage.

41. In a textile sewing machine of the character described, the combination of a stitching machine, a material carriage a movable carriage for the stitching machine, power transmission mechanism for the stitching machine, traction wheels for said carriage, a gear on said transmission mechanism, an extensible drive shaft to mesh with the transmission gear, and means for normally holding said drive shaft with its gear out of engagement with the transmission gear.

42. In a textile sewing machine of the character described, the combination of a stitching machine, a material carriage a movable carriage for the stitching machine, power transmission mechanism for the stitching machine, traction wheels for said carriage, means for applying power from the transmission mechanism to the traction wheels, and means for locking said wheels.

43. In a textile sewing machine of the character described, the combination of a stitching machine, a material carriage, a movable carriage for the stitching machine, power transmission mechanism for the stitching machine, traction wheels for said carriage, a shaft carrying said traction wheels, a gear on said shaft, an extensible driving shaft for said traction wheels having a worm meshing with said gear, a gear on the transmission mechanism, a gear on the driving shaft to mesh with said transmission gear, lever mechanism operating on said shaft to hold the gear normally out of engagement with the transmission gear, a spring acting on said shaft to throw the gear thereon into engagement with the transmission gear, and a locking device operated by said lever mechanism to engage the gear on the traction wheel shaft.

44. In a textile sewing machine of the character described, the combination of a stitching machine, a movable carriage for feeding the material to be sewed to the stitching machine, forward and rear clamps on the material carriage for holding the material, and means operated at the rear clamp for releasing the forward clamp.

45. In a textile sewing machine of the character described, the combination of a stitching machine, a movable carriage for feeding the material to be sewed to the stitching machine, forward and rear clamps on the material carriage for holding the material, a rod extending lengthwise of the carriage and connected to the forward clamp, and means operated at the rear clamp for adjusting said rod to release the forward clamp.

46. In a textile sewing machine of the character described, the combination of a stitching machine, a movable carriage for feeding the material to be sewed to the stitching machine, forward and rear clamps on the material carriage for holding the material, a notched rod extending lengthwise of the carriage and connected to the forward clamp, and means operated at the rear clamp for engaging a notch in said rod to adjust the rod and release the forward clamp.

47. In a textile sewing machine of the character described, the combination of a stitching machine, a movable carriage for feeding the material to be sewed to the stitching machine, forward and rear clamps on the material carriage for holding the material, a notched rod extending lengthwise of the carriage and connected to the forward clamp, a dog on the rear clamp arranged to engage a notch in said rod, and means for adjusting the rear clamp rearward to move said rod endwise and release the forward clamp.

48. In a textile sewing machine of the character described, the combination of a stitching machine, a movable carriage for feeding the material to be sewed to the stitching machine, forward and rear clamps on the material carriage for holding the material, a notched rod extending lengthwise of the carriage and connected to the forward clamp, a spring-pressed dog on the rear clamp arranged to engage a notch in said rod, means for adjusting the rear clamp rearward to move said rod endwise and release the forward clamp, and a stud on the dog to engage said rear clamp and hold the dog out of operative relation to the notched rod.

49. In a textile sewing machine of the character described, the combination of a stitching machine, a carriage for feeding the material to be sewed to the stitching machine, forward and rear clamps on said carriage for holding the material, a notched rod extending lengthwise of the carriage, a rack at one end of said rod, a pinion meshing with said rack, a shaft carrying said pinion, an arm carried by said shaft, a finger engaged with said arm and adapted to release the forward clamp when depressed, and means operated by the forward clamp to engage and move said notched rod endwise and thereby depress said finger.

50. In a textile sewing machine of the character described, the combination of a stitching machine, a carriage for feeding the material to be sewed to the stitching machine, a clamp on the carriage for holding the material, said clamp comprising an arm, a lower jaw slidably supported on said arm, an upper jaw pivotally connected to the lower jaw, a sleeve on the arm, a link connected to the sleeve and pivotally connected to the rear end of the upper jaw, said upper jaw being arched between its pivotal connections with the link and the lower jaw so that its rear end may be depressed below a center line drawn through the arm and the pivotal connection between the jaws.

51. In a textile sewing machine of the character described, the combination of a stitching machine, a carriage for feeding the material to be sewed to the stitching machine, forward and rear clamps on the carriage for stretching and holding the material, and an auxiliary clamp located adjacent to the forward clamp to support the free edge of the material being sewed.

52. In a textile sewing machine of the character described, the combination of a stitching machine, a carriage for feeding the material to be sewed to the stitching machine, forward and rear clamps on the carriage for holding the material, said forward clamp comprising an arm, a slidable jaw and a pivoted jaw supported on the arm, a rod connected to said arm, and an auxiliary clamp comprising a lower jaw rigidly mounted on said rod and an upper jaw movably mounted on said rod and rigidly connected with the upper jaw of the forward clamp upper jaw.

53. In a textile sewing machine of the character described, the combination of a stitching machine, a carriage for feeding the material to be sewed to the stitching machine, end clamps for holding the material on the carriage, matching clamps between the end clamps for holding the material, and means for automatically releasing the matching clamps as they approach the machine.

54. In a textile sewing machine of the character described, the combination of a stitching machine, a carriage for feeding the material to be sewed to the stitching machine, end clamps for holding the material on the carriage, matching clamps between the end clamps for holding the material, means for automatically releasing the matching clamps as they approach the machine, and means for stopping the forward movement of the matching clamps after they are released and while the carriage continues its movement.

55. In a textile sewing machine of the character described, the combination of a stitching machine, a carriage for feeding the material to be sewed to the stitching machine, and clamps for holding the material on the carriage, matching clamps between the end clamps for holding the material, and a tripper arranged in the path of movement of the matching clamps to release them from the material.

56. In a textile sewing machine of the character described, the combination of a stitching machine, a carriage for feeding the material to be sewed to the stitching machine, end clamps for holding the material on the carriage, and matching clamps pivot- 57. In a textile sewing machine of the character described, the combination of a stitching machine, a carriage for feeding the material to be sewed to the stitching machine, end clamps for holding the material on the carriage, matching clamps pivotally mounted on the carriage to hold the material between the end clamps, means for sustaining said matching clamps normally in operative position, and means for automatically releasing said matching clamps to permit them to swing out of operative position and out of the path of the stitching machine.

58. In a textile sewing machine of the character described, the combination of a stitching machine, a carriage for feeding the material to the stitching machine, a plurality of matching clamps pivotally mounted on the carriage for holding the material, means for releasing the matching clamps as they approach the stitching machine, and fixed stops on the machine for engaging the respective matching clamps on the return movement of the carriage to properly position them.

59. In a textile sewing machine of the character described, the combination of a stitching machine, a carriage for feeding the material to be sewed to the stitching machine, a rail on the carriage, a shoe traveling on said rail, a matching clamp frame pivotally mounted on said shoe, a matching clamp carried by said frame and comprising a pivoted jaw to engage the material, a device for locking said jaw, a slidable rod, and a tripper on the stitching machine for operating said rod to release said locking means.

60. In a textile sewing machine of the character described, the combination of a stitching machine, a carriage for feeding the material to be sewed to the stitching machine, a rail on the carriage, a shoe traveling on said rail, a matching clamp frame pivotally mounted on said shoe, a matching clamp carried by said frame and comprising a pivoted jaw to engage the material, a device for locking said jaw, a handle lever for operating said jaw and engaging said locking device, a rod movable endwise in the frame and engaging said locking device, and a tripper on the stitching machine to operate said rod and release the locking device and open the jaw.

61. In a textile sewing machine of the character described, the combination of a stitching machine, a carriage for feeding the material to be sewed to the stitching machine, a rail on the carriage, a shoe to travel on said rail, a matching clamp frame pivoted to the shoe, a clamp on said frame, a sliding rod to release said clamp, a dog on the frame to engage said shoe and sustain the shoe in upright position, a post on the rod engaging said dog, and a tripper on the stitching machine to operate said rod to release the clamp and said dog.

62. In a textile sewing machine of the character described, the combination of a stitching machine, a movable carriage for the material, a transmission mechanism comprising a clutch for the carriage and a clutch for the stitching machine, a controlling rod on the frame of the machine extending lengthwise of the path of travel of the material carriage for operating said clutches, a tripper device adjustably mounted on said rod, and means on the carriage for operating said tripper device to limit the forward movement of the carriage.

63. In a textile sewing machine of the character described, the combination of a stitching machine, a carriage for feeding the material to be sewed to the stitching machine, end clamps on the carriage for holding the material, a rack on the carriage, a gear connected to the rear clamp and meshing with said rack, means for operating said gear to adjust the rear clamp, means for locking the rear clamp in adjusted position, a power transmission mechanism comprising a clutch for the carriage and a clutch for the stitching machine, a controlling rod on the frame of the machine adapted to operate said clutches, and a tripper device on the controlling rod adapted to be engaged by said gear to operate said controlling rod and limit the forward movement of the carriage.

64. In a textile sewing machine of the character described, the combination of a stitching machine, a carriage for feeding the material to be sewed to the stitching machine, a stop device on said carriage, a power transmission mechanism comprising a clutch for the carriage and a clutch for the stitching machine, and means for releasing said clutches comprising an arm adapted to be engaged by said stop device to limit the movement of the carriage.

65. In a textile sewing machine of the character described, the combination of a stitching machine, a carriage for feeding the material to be sewed to the stitching machine, power transmission mechanism for operating the stitching machine and the carriage, a detector arm arranged to engage the seam after it is sewed, and means operated by said detector arm whenever there is a lapse in the seam to release the power and stop the machine.

66. In a textile sewing machine of the character described, the combination of a stitching machine, a carriage for feeding the material to be sewed to the stitching machine, power transmission mechanism for operating the stitching machine and the carriage, means for detecting a lapse in the seam, means operated by said detector means for stopping the machine, and a star wheel engaging the material between the detector and the stitching machine to prevent the detector from pushing the material out of proper position relative to the stitching machine.

67. In a textile sewing machine of the character described, the combination of a stitching machine, a carriage for feeding the material to be sewed to the stitching machine and comprising a hinged foot-board, means for releasing said foot-board to dump the load from the carriage, and means for automatically returning the foot-board to normal position.

68. In a textile sewing machine of the character described, the combination of a stitching machine, a movable carriage for feeding the material to be sewed to the stitching machine and comprising a hinged foot-board normally sustained in elevated position, means for releasing the foot-board to dump the load from the carriage, and means automatically operated on the return movement of the carriage to initial position to return the foot-board to elevated position.

69. In a textile sewing machine of the character described, the combination of a stitching machine, a carriage for feeding the material to be sewed to the stitching machine and comprising a hinged foot-board normally sustained in elevated position, means for releasing the foot-board to dump the load from the carriage, and means for returning the foot-board to elevated position comprising a fixed rack, a shaft connected with the foot-board, a gear on the shaft normally out of the path of the rack, and means for moving said gear into position to make meshing engagement with the rack on the return movement of the carriage to initial position to turn the shaft and return the foot-board to elevated position.

70. In a textile sewing machine of the character described, the combination of a stitching machine, a carriage for feeding the material to be sewed to the stitching machine and comprising a hinged foot-board, a rock shaft supported on the carriage lengthwise thereof, connections between the rock shaft and the foot-board, a transverse shaft supported on the carriage and geared to said rock shaft, and pawl and ratchet mechanism on said transverse shaft for holding the same in locked position and the foot-board in elevated position.

71. In a textile sewing machine of the character described, the combination of a stitching machine, a carriage for feeding the material to be sewed to the stitching machine and comprising a hinged foot-board, a rock shaft supported on the carriage lengthwise thereof, connections between the rock shaft and the foot-board, a transverse shaft supported on the carriage and geared to the rock shaft, pawl and ratchet mechanism operating on the transverse shaft to hold the foot-board normally in elevated position, means for releasing said pawl to permit the foot-board to swing downward and dump the load from the carriage, and means for automatically returning the foot-board to elevated position comprising a fixed rack, a gear slidably mounted on the transverse shaft and held normally out of position to engage the rack, and means operated when the foot-board swings downward to move the gear into position to engage the rack on the return movement of the carriage to initial position, to thereby turn the transverse shaft and return the foot-board to elevated position.

72. In a textile sewing machine of the character described, the combination of a stitching machine, a carriage for feeding the material to be sewed to the stitching machine and comprising a hinged foot-board, a rock shaft supported on the carriage lengthwise thereof, connections between the rock shaft and the foot-board, a transverse shaft supported on the carriage and geared to said rock shaft, pawl and ratchet mechanism operating on the transverse shaft to hold the foot-board normally in elevated position, means for releasing said pawl to permit the foot-board to swing downward and dump the load from the carriage, and means for automatically returning the foot-board to elevated position comprising a fixed rack, a gear slidably mounted on the transverse shaft and held normally out of position to engage the rack, means operated when the foot-board swings downward to move the gear into position to engage the rack on the return movement of the carriage to initial position, said means comprising a yoke engaging said gear, a cam arm movable with the transverse shaft to operate said yoke and shift the gear, a lip on the rack, and a hook on the yoke to engage the rack and hold the gear in operative relation to the rack while the cam arm is returning to initial position.

73. In a textile sewing machine of the character described, the combination of a stitching machine, a carriage for feeding the material to be sewed to the stitching machine, and clamps on said carriage for holding the material, said carriage comprising a hinged foot-board, means for sustaining the foot-board normally in elevated position, and means adapted to be operated by one of the end clamps for releasing said sustaining means to permit the foot-board to swing downward and dump the load from the carriage.

74. In a textile sewing machine of the character described, the combination of a stitching machine, a movable carriage for feeding the material to be sewed to the stitching machine, said carriage comprising a horizontal section and an inclined section, and leaves foldably supported above the inclined section and adapted when extended to project outward from the horizontal section to support a mattress, or work of unbendable nature.

FREDERICK H. HODGKINS.

Witnesses:
W<small>M</small>. O. B<small>ELT</small>,
M. A. K<small>IDDIE</small>.